US010008052B2

(12) United States Patent
Wilson et al.

(10) Patent No.: US 10,008,052 B2
(45) Date of Patent: *Jun. 26, 2018

(54) MODEL GENERATION AND MONITORING SYSTEM FOR A MACHINE

(71) Applicant: Caterpillar Inc., Peoria, IL (US)

(72) Inventors: Jeremy R. Wilson, Ebensburg, PA (US); James F. Stascavage, Virginia Beach, VA (US); Melinda F. Vergara, Virginia Beach, VA (US); Jeffrey M. Mauntel, Moyock, NC (US); Bradley DuPont, Fort Worth, TX (US)

(73) Assignee: Caterpillar Inc., Deerfield, IL (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/164,537

(22) Filed: May 25, 2016

(65) Prior Publication Data

US 2017/0345233 A1 Nov. 30, 2017

(51) Int. Cl.
*G07C 5/08* (2006.01)
*B60Q 9/00* (2006.01)

(52) U.S. Cl.
CPC ............ *G07C 5/0841* (2013.01); *B60Q 9/00* (2013.01)

(58) Field of Classification Search
CPC ... G07C 5/0841; G06F 17/5009; G05B 17/02; B60Q 9/00
USPC .............................................. 701/29.1; 703/7
See application file for complete search history.

(56) References Cited

U.S. PATENT DOCUMENTS

| 4,672,537 | A  | * | 6/1987 | Katzman | G06F 12/1458 |
| | | | | | 711/E12.093 |
| 5,727,000 | A  | * | 3/1998 | Pizzica | G01R 31/3177 |
| | | | | | 714/732 |
| 7,689,368 | B2 | * | 3/2010 | Douglas | G01N 35/00722 |
| | | | | | 324/71.1 |
| 9,450,833 | B2 | * | 9/2016 | Griffith | H04L 43/0817 |
| 9,606,022 | B2 | * | 3/2017 | Kumar | G01M 15/02 |
| 9,694,834 | B2 | * | 7/2017 | Shubs, Jr. | B61L 15/0081 |

(Continued)

OTHER PUBLICATIONS

Erdinc et al., Fast Diagnosis With Sensors of Uncertain Quality, 2008, IEEE, p. 1157-1165.*

(Continued)

*Primary Examiner* — McDieunel Marc
(74) *Attorney, Agent, or Firm* — Finnegan, Henderson, Farabow, Garrett & Dunner, LLP

(57) ABSTRACT

A monitoring system for a machine having database, a memory storing first instructions, and a controller configured to execute the first instructions. The controller may be configured to receive a first input including selection of a sensor associated with a component of the machine, and a second input specifying a machine state, defining a first operating condition associated with the component. The controller may also be configured to receive a third input specifying generation of a component parameter based on a measurement from the sensor, and a fourth input specifying a fault condition associated with at least one of the measurement and the component parameter. The controller may generate a rule-set, including second instructions based on the first input, the second input, the third input, and the fourth input. The controller may also store the rule-set in the database.

20 Claims, 11 Drawing Sheets

(56) References Cited

U.S. PATENT DOCUMENTS

2006/0206246 A1* 9/2006 Walker .................. G06Q 10/00
701/16

OTHER PUBLICATIONS

Gomez et al., Fault Detection in Electric Motors by means of the Extended Kalman Filter as Disturbance Estimator, 2014, IEEE, p. 432-437.*

Kreibich et al., Quality-Based Multiple-Sensor Fusion in an Industrial Wireless Sensor Network for MCM, 2013, IEEE, p. 4903-4911.*

Zhang et al., A Probabilistic Fault Detection Approach: Application to Bearing Fault Detection, 2011, IEEE, p. 2011-2018.*

Stein et al., Modelig and Sing Issues for Machi Diagcsics, 1988, IEEE, p. 1924-1929.*

Xue et al., Parametric model-based anomaly detection for locomotive subsystems, 2007, IEEE, p. 1-6.*

Xi et al., Diagnosability of Faults using Finite-state Automaton Model, 2000, IEEE, p. II-367 to II-371.*

U.S. Patent Application of Jeremy R. Wilson et al., entitled "Model Generation System for a Machine," filed May 25, 2016.

* cited by examiner

MODEL GENERATION AND MONITORING SYSTEM FOR A MACHINE

TECHNICAL FIELD

The present disclosure relates generally to a monitoring system, and, more particularly, to a model generation and monitoring system for a machine.

BACKGROUND

Machines, for example, marine vessels, earth-moving machines, construction equipment, etc. include numerous components that may wear and/or fail over time. Repair or replacement of worn out or failed machine components may require removing the machine from service, which may decrease utilization of the machine. The time required to procure a replacement part, or unavailability of repair personnel or facilities may further increase the down time associated with performing maintenance on the machine. Therefore, it is desirable to monitor the wear rate of machine components and/or to predict when the machine may require maintenance including repair or replacement of worn out components. Such monitoring and prediction capabilities may also allow procurement of replacement parts in advance so that the parts are available when the maintenance is scheduled on the machine. In addition, such monitoring and prediction capabilities may make it possible to schedule maintenance activities during a period when the machine is not expected to be in use, thereby maximizing utilization of the machine.

One approach to monitoring the health of machine components relies on analyzing data collected from various sensors associated with the machine. However, collecting sensor data continuously can be expensive because it may require dedicated systems for collection and storage of the sensor data. On the other hand, periodic data collection may mask trends that may help determine the onset or severity of wear of a machine component. Collecting sensor data periodically may fail to capture sensor data during unexpected events, for example, during an unscheduled shutdown of the machine. Thus, there is a need for a diagnostic model that allows collection of data from the right sensors at the appropriate time.

The model generation and monitoring system of the present disclosure solves one or more of the problems set forth above and/or other problems in the art.

SUMMARY

In one aspect, the present disclosure is directed to a monitoring system for a machine. The monitoring system may include a database, a memory configured to store first instructions, and a controller configured to execute the first instructions. The controller may be configured to receive a first input including selection of a sensor associated with a component of the machine. The controller may further be configured to receive a second input specifying a machine state, defining a first operating condition associated with the component. The controller may also be configured to receive a third input specifying generation of a component parameter based on a measurement from the sensor. In addition, the controller may be configured to receive a fourth input specifying a fault condition associated with at least one of the measurement and the component parameter. The controller may be configured to generate a rule-set, including second instructions based on the first input, the second input, the third input, and the fourth input. The controller may also be configured to store the rule-set in the database.

In another aspect, the present disclosure is directed to a method of monitoring a machine. The method may include receiving a first input including selection of a sensor associated with a component of the machine. The method may further include receiving a second input specifying a machine state, defining a first operating condition associated with the component. The method may also include receiving a third input specifying generation of a component parameter based on a measurement from the sensor. In addition the method may include receiving a fourth input specifying a fault condition associated with at least one of the measurement and the component parameter. The method may include generating a rule-set, using a first controller. The rule-set may include second instructions based on the first input, the second input, the third input, and the fourth input. The method may also include storing the rule-set in the database. Further the method may include accessing, using a second controller, the rule-set including the second instructions from the database. The method may include executing, using the second controller, the second instructions. The second controller may be configured to determine whether a second operating condition of the component satisfies the machine state in the rule-set. When the second controller determines that the second operating condition satisfies the machine state, the second controller may be configured to receive the measurement from the sensor. The second controller may also be configured to generate the component parameter based on the measurement. Further, the second controller may be configured to determine whether the component parameter satisfies the fault condition. In addition, the second controller may be configured to activate an alarm when the component parameter satisfies the fault condition.

DETAILED DESCRIPTION

Figure 1:
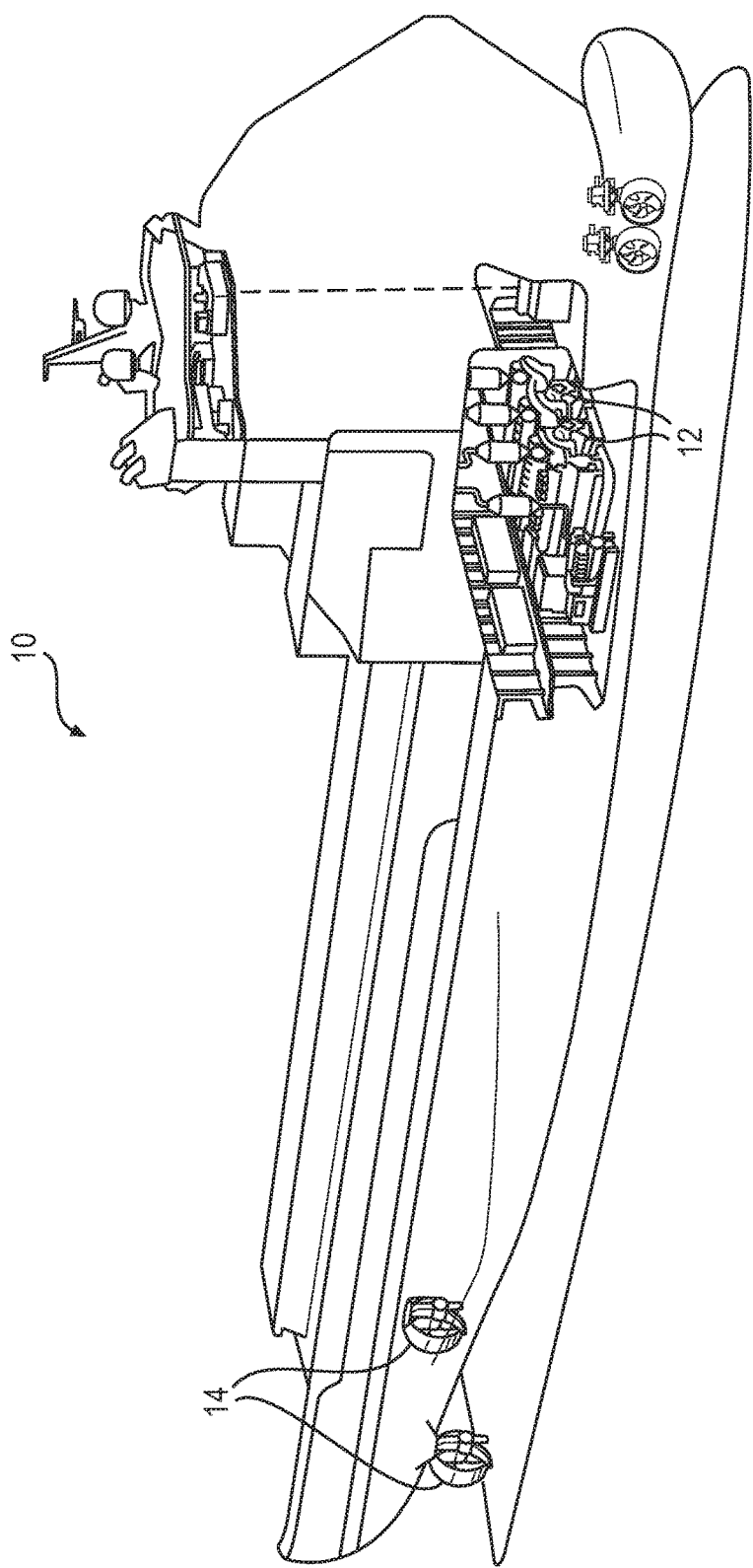
FIG. 1 is a pictorial illustration of an exemplary disclosed machine.

FIG. 1 illustrates an exemplary embodiment of a machine 10. In the disclosed example, machine 10 is a marine vessel. It is contemplated, however, that machine 10 could embody another type of machine (e.g., a wheel loader, dozer, truck, excavator, shovel, etc.). Machine 10 may include, among other things, one or more power sources 12 (e.g. engines) and one or more propellers 14. Engines 12 of machine 10 may be configured to drive propellers 14 to propel machine 10 in a forward or rearward direction. Machine 10 may be equipped with steering mechanisms (not shown) that may allow the direction of motion of machine 10 to be altered. Although only two engines 12 are illustrated in FIG. 1, it is contemplated that machine 10 may have any number of engines 12. It is also contemplated that machine 10 may include other equipment (e.g. generators, motors, pumps, etc.) in addition to engines 12 and propellers 14.

Figure 2:
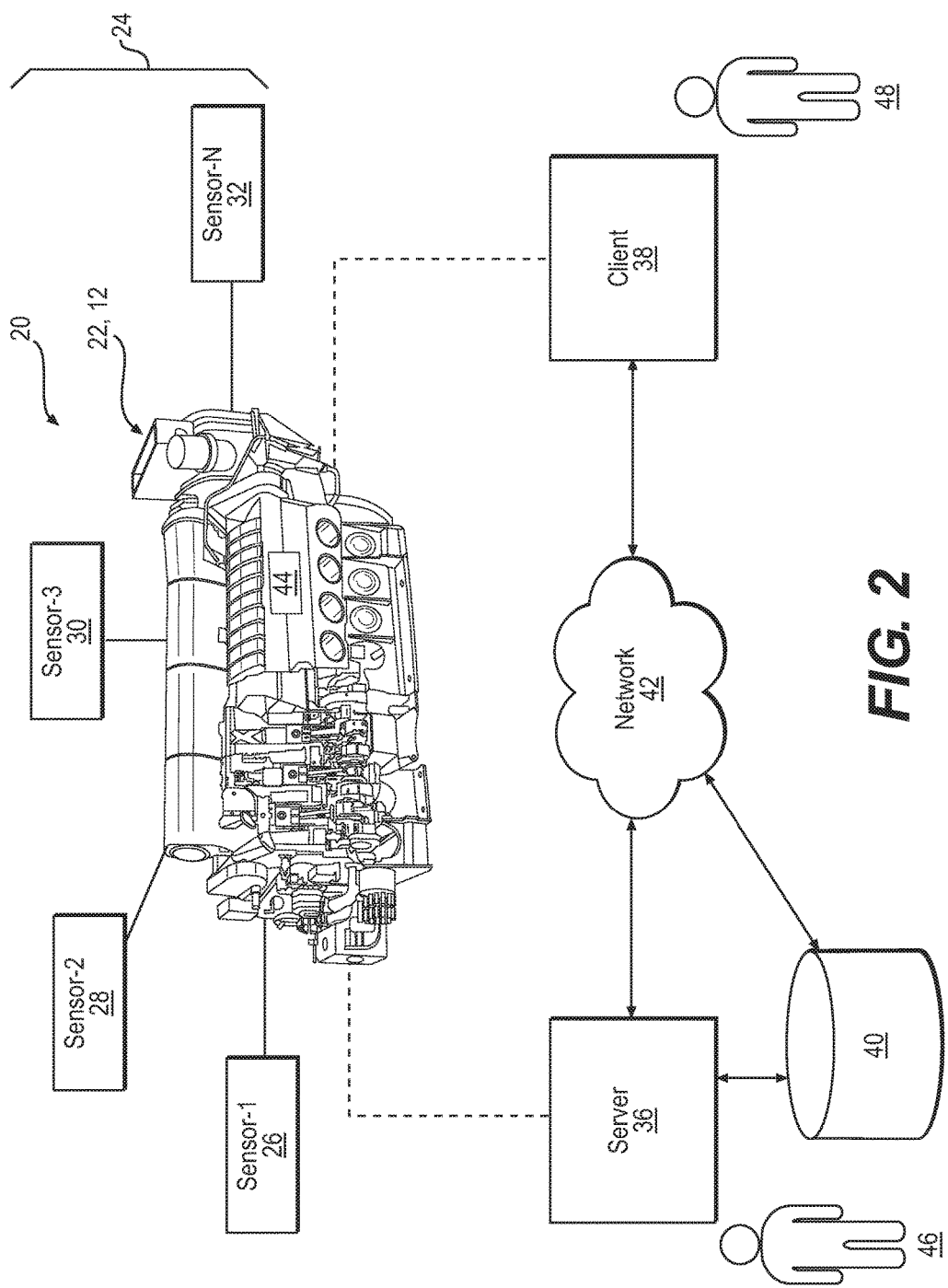
FIG. 2 is a schematic illustration of an exemplary disclosed model generation and monitoring system for the machine of FIG. 1.

FIG. 2 illustrates an exemplary system 20 for generating a diagnostic model for one or more components 22 of machine 10, and for monitoring the performance of the one or more components 22 of machine 10 using the diagnostic model. In one exemplary embodiment illustrated in FIG. 2, component 22 may be an engine 12. It is contemplated, however, that component 22 may include propellers 14 or other components, for example, motors, generators, pumps, etc. of machine 10. In another exemplary embodiment, component 22 may be the entire machine 10.

System 20 may further include sensor arrangement 24 associated with component 22. For example, as illustrated in FIG. 2, sensor arrangement 24 may include sensors 26, 28, 30, 32, which are titled "Sensor-1," "Sensor-2," "Sensor-3," and "Sensor-N" in FIG. 2. Although only four sensors 26-32 are illustrated in FIG. 2, it is contemplated that component 22 may include any number of sensors 26-32. System 20 may include one or more servers 36, one or more clients 38, and one or more databases 40. Sensors 26-32, servers 36, clients 38, and databases 40, may communicate with each other and exchange information via network 42.

Sensors 26-32 may be configured to monitor a variety of operational parameters associated with component 22. Sensors 26-32 may be one or more of temperature sensors, pressure sensors, flow-rate sensors, speed sensors, torque sensors, power sensors, oxygen sensors, emissions sensors, or any other type of sensors known in the art and configured to measure one or more operational parameters associated with component 22. For example, one or more of sensors 26-32 may be temperature sensors configured to measure temperatures in different portions of component 22 (e.g. combustion chamber of engine 12, intake air entering engine 12, exhaust gas exiting engine 12, etc.). As another example, one or more of sensors 26-32 may be pressure sensors configured to measure pressures in one or more fluid passages associated with component 22 (e.g. pressure of air entering engine 12, pressure of fuel being injected into combustion chambers of engine 12, pressure of exhaust gases exiting engine 12, etc.). As yet another example, one or more of sensors 26-32 may be flow-rate sensors configured to measure flow rates fluids associated with component 22 (e.g. flow rate of fuel supplied to component 22, flow rate of air into combustion chambers of engine 12, etc.).

Component 22 may include one or more controllers 44 configured to control operations of component 22 and/or sensors 26-32. Controllers 44 may be configured to exchange data and/or instructions with sensors 26-32, servers 36, clients 38, and databases 40 via network 42. In one exemplary embodiment, one or more controllers 44 may be configured to control sensors 26-32 to collect data from component 22, continuously or during predetermined time periods.

Server 36 may include one or more servers configured to interact with network 42. Server 36 may be a desktop computer or a server computer. Server 36 may be implemented as a server, a server system comprising a plurality of servers, or a server farm comprising a load balancing system and a plurality of servers. Server 36 may be configured to communicate with client 38, and/or database 40 directly or via network 42. Server 36 may also be configured to communicate with controller 44 and/or sensor arrangement 24 of component 22 directly or via network 42. Client 38 may be a desktop computer or a server computer. Client 38 may be configured to communicate with controller 44 and/or sensor arrangement 24 of component 22 directly or via network 42. Client 38 may also be configured to communicate with server 36 and database 40 directly or via network 42. Server 36 and/or client 38 may be a portable computer, for example, a laptop computer, a tablet computer, or another mobile device known in the art. Server 36 may be operable by operator 46 and client 38 may be operable by operator 48. It is also contemplated that operators 46 and 48 may each be capable of operating one or both of server 36 and client 38.

Database 40 may include one or more logically and/or physically separate databases configured to store data and/or instructions. Data stored in database 40 may include data collected by sensors 26-32 of sensor arrangement 24, instructions executed by server 36 and/or client 38, and/or data or information generated by server 36 and/or client 38. In one exemplary embodiment, database 40 may be implemented using a non-transitory computer-readable storage medium. In another exemplary embodiment, database 40 may be maintained in a network attached storage device, in a storage area network, or combinations thereof, etc. Database 40 may store the data on storage devices, which may include, for example, hard drives, RAID arrays, solid state drives, NOR or NAND flash memory devices, and/or Read Only Memory (ROM) devices. Furthermore, database 40 may be maintained and queried using numerous types of database software and programming languages, for example, SQL, MySQL, IBM DB2®, Microsoft Access®, PERL, C/C++, Java®, etc.

Network 42 may facilitate electronic communication and exchange of data between sensor arrangement 24, server 36, client 38, database 40, and/or controller 44. In certain exemplary embodiments, network 42 may include any combination of communications networks. For example, network 42 may include the Internet and/or another type of local area network (LAN) or wide area network (WAN), an intranet, a metropolitan area network, a wireless network, a cellular communications network, a satellite network, etc.

Figure 3:
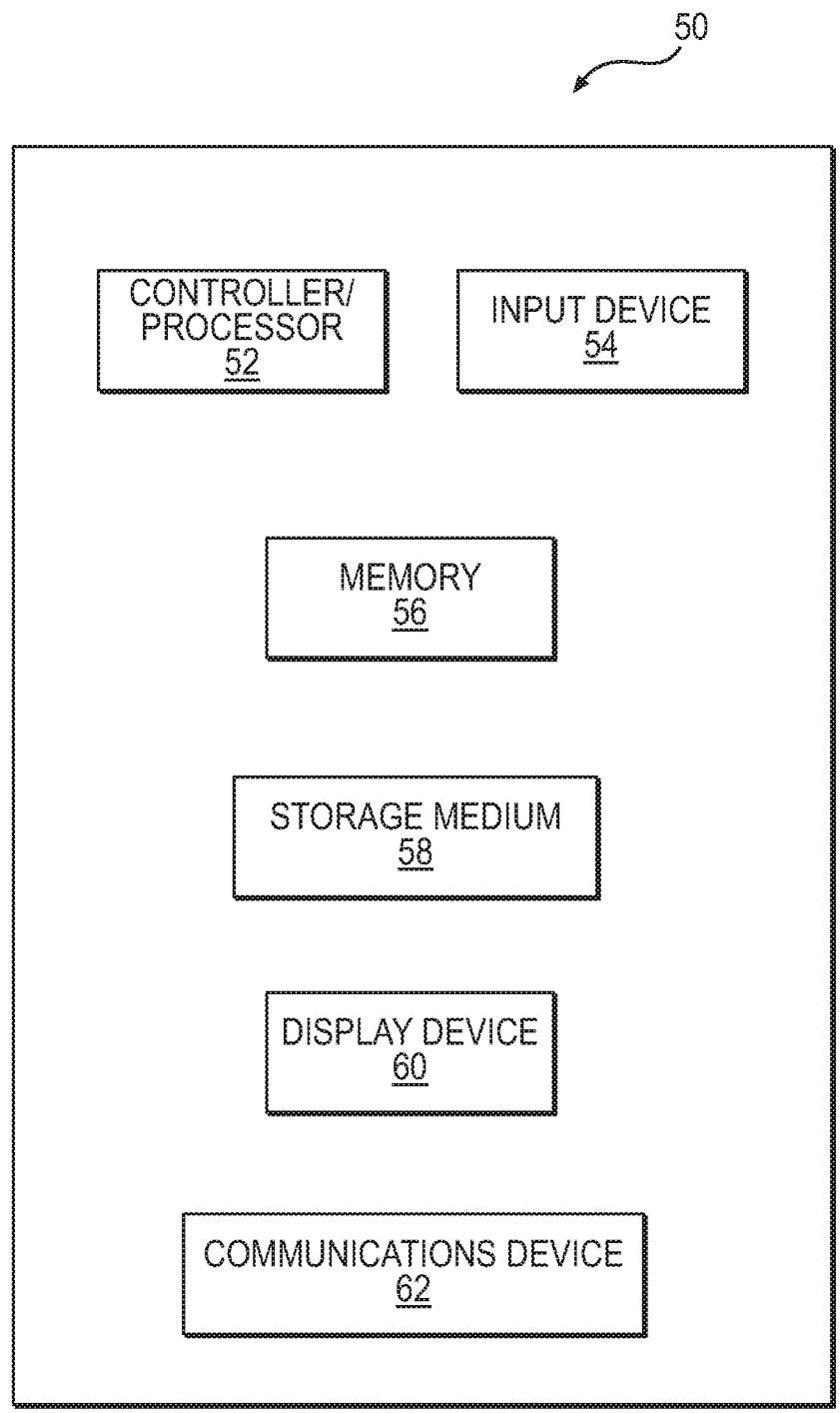
FIG. 3 is a schematic illustration of an exemplary disclosed client or server device used in the monitoring system of FIG. 2.

FIG. 3 illustrates an exemplary device 50, which may be a server 36 or a client 38, associated with model generation system 20. Device 50 may include one or more controllers 52, input devices 54, memories 56, storage media 58, display devices 60, and communications devices 62. Controllers 52 may be processors that may be configured to control operations of input devices 54, memories 56, storage media 58, display devices 60, and/or communications devices 62. Controller 44 of component 22, and controllers 52 of server 36 and/or client 38 may each embody a single or multiple microprocessors, digital signal processors (DSPs), etc. Numerous commercially available microprocessors can be configured to perform the functions of each of controllers 44 and 52. Various other known circuits may be associated with each of controllers 44 and 52, including power supply circuitry, signal-conditioning circuitry, and communication circuitry.

Input devices 54 may be associated with controller 52 and may be configured to receive inputs from one or more of operators 46, 48 of system 20. In one exemplary embodiment, input device 54 may enable an operator 46 and/or 48 of system 20 to make selections of one or more portions of text and or graphical images displayed on display device 60. Input device 54 may also enable operators 46, 48 to provide numerical, textual, graphic, or audio-visual inputs to controller 52. Input device 54 may include a physical keyboard, virtual touch-screen keyboard, touch-screen interface, gesture recognition interface, mouse, joystick, stylus, etc. Input device 54 may also include one or more microphones or other audio devices using, for example, speech-to-text and/or voice recognition applications.

Memory 56 may embody non-transitory computer-readable media, for example, Random Access Memory (RAM) devices, NOR or NAND flash memory devices, and Read Only Memory (ROM) devices. Storage medium 58 may embody non-transitory computer-readable media, such as, RAM, NOR, NAND, or ROM devices, CD-ROMs, hard disks, floppy drives, optical media, solid state storage media, etc.

One or more display devices 60 may be associated with controller 52 and may be configured to display data or information in cooperation with controller 52. For example, display device 60 may be configured to display textual and/or image information. Display device 64 may be a cathode ray tube (CRT) monitor, a liquid crystal display (LCD), a light emitting diode (LED) display, a projector, a projection television set, a touchscreen display, or any other kind of display device known in the art. Communication device 62 may be configured to wirelessly send or receive data and/or instructions. Communication device 62 may include hardware and/or software that enable the sending and/or receiving of data and/or instructions via network 42.

In one exemplary embodiment, controller 52 of server 36 may be configured to generate a diagnostic model of engine 12. Controller 52 may execute instructions stored in memory 56, storage medium 58, and/or database 40 to generate the diagnostic model based on inputs received via input device 54, or based on inputs accessed from memory 56, storage medium 58, and/or database 40. In another exemplary embodiment, controller 52 may receive inputs from operators 46, 48 via input device 54 for generating the diagnostic model. As further explained below with respect to FIG. 4, controller 52 may receive inputs regarding one or more sensors 26-32, one or more calculations performed using measurements from the sensors 26-32, one or more conditions and/or fault conditions based on the measurements or the calculations, one or more machine states, representing operational conditions of component 22 and/or machine 10, and/or one or more charts showing a graphical plot of the measurements from one or more sensors 26-32, or of results from one or more calculations.

Controller 52 may also receive one or more inputs regarding the types of alerts or alarms to be generated when a fault condition occurs. For example, an input may specify that a graphical icon should be displayed on display device 60 when the fault condition occurs. The shape, size, color, and animation of the graphical icon may be based on a severity or frequency of the fault condition. It is also contemplated that the input may specify other types of audio or audio-visual alerts that may be activated based on the fault condition.

Controller 52 may combine the inputs received into a rule-set that defines the diagnostic model including the selected sensors, the specified calculations, the specified faults, the specified alarms, and the specified machine state. Controller 52 may also generate instructions and/or code representing the inputs. Controller 52 may include the instructions and/or code in the rule-set. The code or instructions may also be executable by controller 52. Controller 52 may store the rule-set including the instructions and/or code in database 40.

Controller 52 may also be configured to access a rule-set stored in database 40. Controller 52 may execute the instructions and/or code associated with the rule-set to determine whether component 22 is in the machine state specified in the rule-set. Controller 52 may control one or more sensors 26-32 to receive data from sensors 26-32 of component 22, when component 22 is in the machine state specified in the rule-set. Controller 52 may also execute the instructions and/or code associated with the rule-set to perform calculations on the data received from the selected sensors 26-32 to determine whether one or more fault conditions is satisfied. In addition, controller 52 may execute the instructions and/or code associated with the rule-set to trigger one or more alarms when the one or more fault conditions is satisfied.

INDUSTRIAL APPLICABILITY

The model generation and monitoring system 20 of the present disclosure may be used to generate one or more diagnostic models for one or more components of machine 10. In particular, the disclosed system 20 may be used to generate a model for collecting data from selected sensors during specified operational conditions of machine 10. The disclosed system 20 may be further used to perform calculations on the collected data to determine various component parameters. The disclosed system 20 may also be used to determine whether the component parameters satisfy the fault conditions specified in the rule-set. Additionally, the disclosed system 20 may be used to trigger alarms indicating potential precursors of failures. The disclosed system 20 may also recommend corrective actions based on the detected fault conditions. Exemplary methods of operation of model generation and monitoring system 20 will be discussed below.

Figure 4:
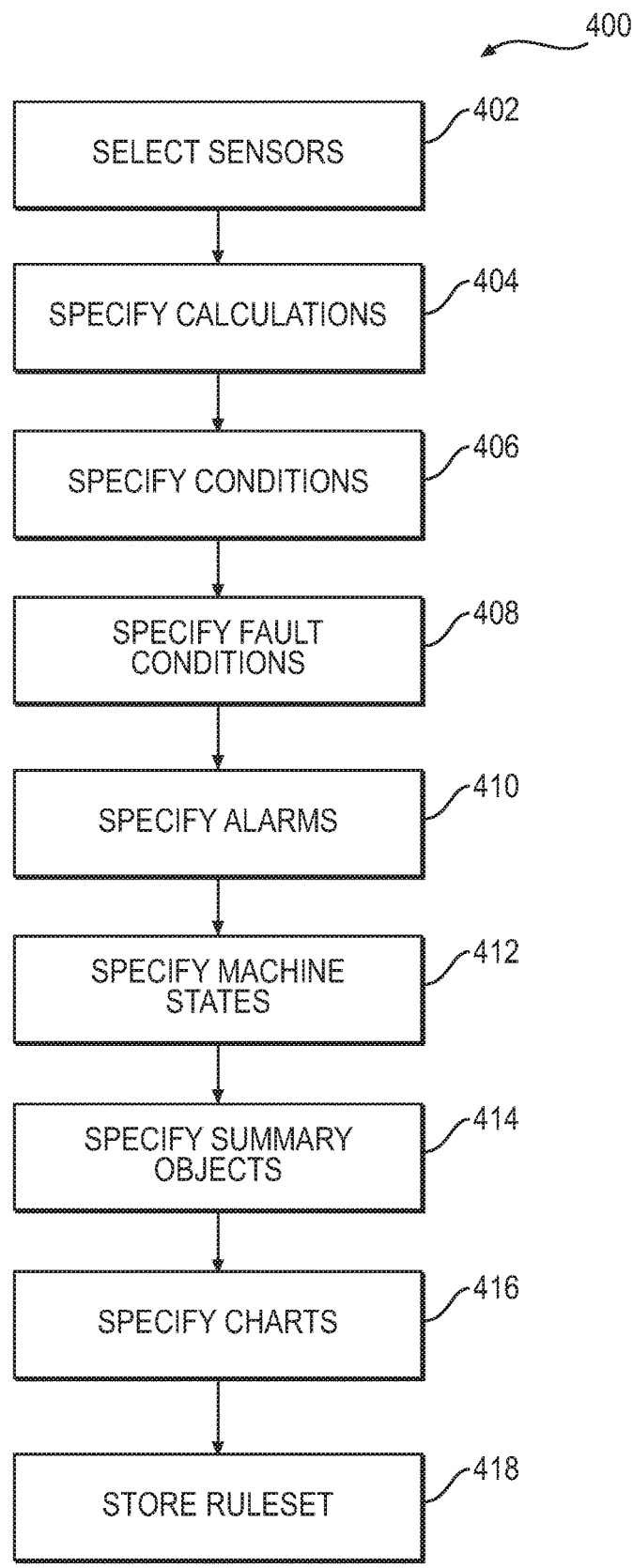
FIG. 4 is a flow chart illustrating an exemplary disclosed model generation method for the model generation and monitoring system of FIG. 2.

FIG. 4 illustrates an exemplary method 400 of generating a diagnostic model for one or more components 22 (e.g. engine 12) of machine 10. In one exemplary embodiment, controller 52 may execute instructions stored in memory 56, storage medium 58, or database 40 to perform method 400. The order and arrangement of steps in method 400 is provided for purposes of illustration. As will be appreciated from this disclosure, modifications may be made to method 400 by, for example, adding, combining, removing, and/or rearranging the steps of method 400. Method 400 may be executed by server 36 and/or client 38.

Method 400 may include a step of selecting sensors for the diagnostic model (Step 402). Selecting sensors may include selecting one or more of sensors 26-32 associated with component 22 of machine 10. In one exemplary embodiment, a sub-set of one or more of sensors 26-32 may be selected from all the sensors associated with component 22. Selecting sensors may include specifying one or more attributes of the selected sensor 26-32. For example, the attributes may include a sensor name, a unit of measurement for a quantity measured by each selected sensor 26-32, lower and upper limit values for the measurement made by each selected sensor, and low and high alarm limits for each sensor 26-32. The lower and upper limit values may represent the minimum and maximum values, respectively, of the measurement made by the selected sensor 26-32. The low alarm limit may indicate that an alert may be activated when a measurement received from the sensor is less than the low alarm limit. Likewise, the high alarm limit may indicate that the alert may be activated when a measurement received from the sensor is greater than the high alarm limit.

The attributes may also include a tag identifier (Tag ID) for sensor 26-32. The Tag ID may be an identifier of a sensor actually disposed on or in (i.e. physically attached to) component 22. In one exemplary embodiment, Tag ID may be the identifier that controller 44 and/or controller 52 may use to control and obtain measurements from sensor 26-32. Thus, for example, a sensor may have a name "Sensor-2," but a Tag ID "28" (see FIG. 2). It is contemplated that controller 52 may receive inputs regarding one or more sensors that may not physically exist in component 22. It is further contemplated that sensors that do not physically exist in component 22 will not have Tag IDs. It is contemplated that in some exemplary embodiments, controller 52 may access default units of measurement, and default lower and upper limit values, default lower and upper alarm limit values, and Tag IDs stored in memory 56, storage medium 58, or database 40 for each of the selected sensors 26-32.

Method 400 may include a step of specifying one or more calculations for the diagnostic model (Step 404). Specifying calculations may also include specifying one or more calculation attributes of the calculation, for example, a name of the calculation, a unit of measurement associated with a result of the calculation, expected minimum and maximum values of the result, and a function defining the mathematical operations for the calculation. The function may include mathematical operations that may be performed on data (i.e. measurements) received from one or more of sensors 26-32 selected in, for example, step 402. The mathematical operations may allow determination of one or more component parameters that may help characterize performance of the component 22. For example, component parameters may include air flow rate, fuel flow rate, air-fuel ratio, lubricant or coolant flow rate, compression ratio, specific fuel consumption, power output, torque output, amounts of effluents (e.g. carbon monoxide, carbon dioxide, nitrous oxide, sulfur dioxide, ammonia, unburned fuel, soot, etc.) in the exhaust gases, change in lubricant or coolant temperatures, or any other operational parameters for component 22 known in the art. In some exemplary embodiments, the mathematical operations may include calculations for converting the units of measurement associated with one or more of the selected sensors 26-32. For example, the mathematical operations may include a calculation for converting a temperature measured by a sensor in degrees Fahrenheit into a temperature value in degrees Celsius.

Method 400 may include a step of specifying conditions for the diagnostic model (Step 406). Specifying conditions may include specifying attributes including a name for each condition, and threshold values that may be compared with measurements from one or more sensors 26-32, or with results of one or more calculations specified in, for example, step 404 of method 400. Specifying conditions may further include specifying when a condition may return a "True" value (i.e. when the condition is satisfied), and when the condition may return a "False" value (i.e. when the condition is not satisfied). In addition, specifying the conditions may include combining two or more conditions using boolean operators. The boolean operators may include well known operators such as "AND," "OR," "NOT," "NAND," "NOR," "XOR," "XNOR," etc.

Method 400 may include a step of specifying fault conditions for the diagnostic model (Step 408). Specifying fault conditions may include combining two or more conditions specified in, for example, step 406, using boolean operators. Specifying fault conditions may further include specifying when a fault condition may return a "True" value (i.e. when the fault condition is satisfied), and when the fault condition may return a "False" value (i.e. when the fault condition is not satisfied). Specifying fault conditions may also include specifying whether a fault condition is active or inactive. Only active fault conditions may be evaluated for component 22, while inactive fault conditions may be ignored even when the inactive fault conditions are satisfied. In one exemplary embodiment, a fault condition may indicate that the values of the component parameters for component 22 fall outside predetermined or desired ranges. For example, a fault condition may be triggered (i.e. satisfied) when the temperature of exhaust gases from engine 12 exceeds a threshold temperature. In another exemplary embodiment, a fault condition may be satisfied only when a predetermined number of measurements from sensors 26-32, and/or a predetermined number of calculations (e.g. from step 404) exceed a threshold.

Method 400 may include a step of specifying alarms for the diagnostic model (Step 410). Specifying alarms may include specifying visual or audio alerts that may be triggered when one or more fault conditions specified in, for example, step 408, may be satisfied. Specifying alarms may include selecting graphical icons for display on display device 60. Specifying alarms may further include specifying the visual appearance (i.e. color, background, animation, etc.) of the selected graphical icons. In one exemplary embodiment, the graphical icon may be a status pill icon, which may be a geometrical shape (e.g. circular, rectangular, etc.) configured to display a color. Specifying alarms may include specifying the color of the status pill icon (e.g. green, yellow, red, etc.) when a fault condition is satisfied. In another exemplary embodiment, the graphical icon may be a status strip icon configured to display a variation of the colors of a status pill icon over a period of time. Specifying alarms may include specifying the period of time for which the status strip icon may display colors of the status pill. Specifying alarms may further include specifying an audio alert, for example, specifying a sound that may be played using audio equipment associated with system 20. In addition, specifying alarms may include specifying a duration and/or frequency for which alerts may be activated (i.e. displayed on display device 60, or played if it is an audio alert).

Method 400 may include a step of specifying one or more machine states for the diagnostic model (Step 412). As discussed above, a machine state may define operating conditions of component 22. Machine states may be specified in many ways. For example, a machine state may be specified by defining a threshold value for measurements obtained from a selected sensor 26-32. Data may be collected from one or more sensors 26-32 and analyzed to evaluate fault conditions only when measurements from the selected sensor exceed or lie below the threshold value. Alternatively the machine state may be specified by defining a range of values for measurements obtained from a selected sensor 26-32. Data may be collected from one or more sensors 26-32 and analyzed to evaluate fault conditions only when the measurements from the selected sensor lie within the defined range. The machine state may also be specified in terms of threshold values or ranges for results of a calculation specified in, for example, step 404. Machine states may be specified in terms of events associated with component 22 and/or machine 10. For example, a machine state may be specified as "Start-up" or "Shutdown" indicating that data may be collected from one or more sensors 26-32 and analyzed to evaluate fault conditions only during start-up or shutdown event of component 22 and/or machine 10.

Specifying machine states may include associating the one or more machine states with the one or more fault conditions specified in, for example, step 408 and with the one or more alarms specified in, for example, step 410. Associating the machine state with the specified fault conditions may help ensure that the specified fault conditions are evaluated only when component 22 is in the specified machine state. Likewise, associating the machine state with the specified alarms may help ensure that the specified alarms are triggered only when component 22 is in the specified machine state. By limiting evaluation of fault conditions and triggering of alarms to specified machine states, incorrect determination of faults may be prevented. For example, during start-up of engine 12 from a cold start, temperatures of lubricants and/or coolant in engine 12 may be significantly lower than the temperatures attained during continuous operation of engine 12. A fault condition based on detecting an abnormally low coolant temperature may be triggered during start-up even though engine 12 may be operating normally. To prevent misdiagnoses, a machine state may specify a duration of time after start-up (i.e. beginning of operation of engine 12) so that coolant temperature may be compared with a specified low coolant temperature threshold only after the engine has been operating for the specified duration of time after start-up.

Method 400 may include a step of defining one or more summary objects for the diagnostic model (Step 414). A summary object may specify a number of data points that may be used to determine the visual appearance of various graphical icons (e.g. status pill icons, status strip icons, etc.) specified in, for example, step 410. In one exemplary embodiment the data points may be individual measurements received from one or more of the selected sensors 26-32. In another exemplary embodiment, the data points may be results of calculations obtained from the individual measurements. In yet another exemplary embodiment, the data points may be a combination of the measurements and the calculations. The summary object may specify the number of data points for which a fault condition must be satisfied (i.e. must return a "True" value) for a graphical icon (e.g. status pill icon) to display a predetermined color. A color of the status pill icon may indicate a severity of one or more fault. By way of example, a summary object may specify that when a fault condition is triggered for 9 of the past 20 data points, the status pill icon may have a green color (indicating low severity); when the fault condition is triggered for 10 to 14 of the past 20 data points, the status pill icon may have a yellow color (indicating medium severity); and when the fault condition is triggered for 15 to 20 of the past 20 data points, the status pill icon may have a red color (indicating high severity).

In some exemplary embodiments, specifying summary objects may include specifying a buffer, which may define a total number of data points that may be used to determine the appearance of a graphical icon. The buffer may be a portion of memory 56 and/or storage medium 58 allocated for storing data associated with the specified number of data points. Thus, in the above example, when the total number of data points is 20, sufficient storage space may be allocated in memory 56 and/or storage medium 58 to store the 20 different measurements, calculations, conditions, and/or combinations thereof. When a 21st data point is obtained from component 22 and/or machine 10, portions of the buffer may be overwritten. Thus for example, the 21st data point may overwrite the portion of the buffer in which the 1st data point may have been stored. Specifying summary objects may also include associating the one or more summary objects with the one or more fault conditions specified in, for example, step 408.

Method 400 may include a step of specifying one or more charts for the diagnostic model (Step 416). Specifying charts may include specifying the variables to be plotted along the abscissa axis and ordinate axis of each chart. In one exemplary embodiment, specifying a chart may include associating a selected sensor 26-32 or a selected calculation with an ordinate axis of the chart. In this case, an abscissa of the chart may assume a default variable of time. Thus, in this exemplary embodiment, the chart may visually display a plot of the selected sensor 26-32 or calculation with time. In another exemplary embodiment, it may be possible to specify a selected sensor 26-32 or a selected calculation as the abscissa, and a different selected sensor 26-32 or calculation as the ordinate. Thus, in this exemplary embodiment, the chart may display a variation of one selected sensor 26-32 or calculation versus another selected sensor 26-32 or calculation.

Method 400 may include a step of storing a rule-set for the diagnostic model (Step 416). The rule-set may include the attributes of all selected sensors (e.g. from step 402), attributes of all specified calculations (e.g. from step 404), attributes of all specified conditions (e.g. from step 406), attributes of all specified fault conditions (e.g. from step 408), attributes of all specified alarms (e.g. from step 410), attributes of all specified machine states (e.g. from step 412), attributes of all specified summary objects (e.g. from step 414), and attributes of all specified charts (e.g. from step 416). Storing the rule-set may also involve generating using controller 52 instructions or code required to implement the calculations, conditions, faults, alerts, and charts disclosed in steps 402-416, and storing the instructions or code. The rule-set may be stored in memory 56, storage medium 58, and/or database 40.

In one exemplary embodiment, controller 52 may display one or more graphical user interfaces (GUIs) on display device 60 to aid operators 46, 48 with providing the necessary inputs required in the various steps of method 400. Exemplary embodiments of GUIs that may be used with method 400 are described below with reference to FIGS. 5-10. Although various GUI elements (e.g. windows, buttons, checkboxes, radio buttons, pull-down menus, palettes, etc.) are described with regard to the embodiments of FIGS. 5-10, it is contemplated that each of the GUIs in FIGS. 5-10 may include fewer than or more than the disclosed and illustrated GUI elements. Additionally, it is contemplated that the GUI elements in the exemplary embodiments of FIGS. 5-10 are not limited to the disclosed arrangements but may be displayed in a variety of different arrangements known in the art. For example, windows and buttons illustrated as being disposed side-by-side or one below the other may be displayed as partially overlapping, nested, or using any other display arrangement known in the art.

Figure 5:
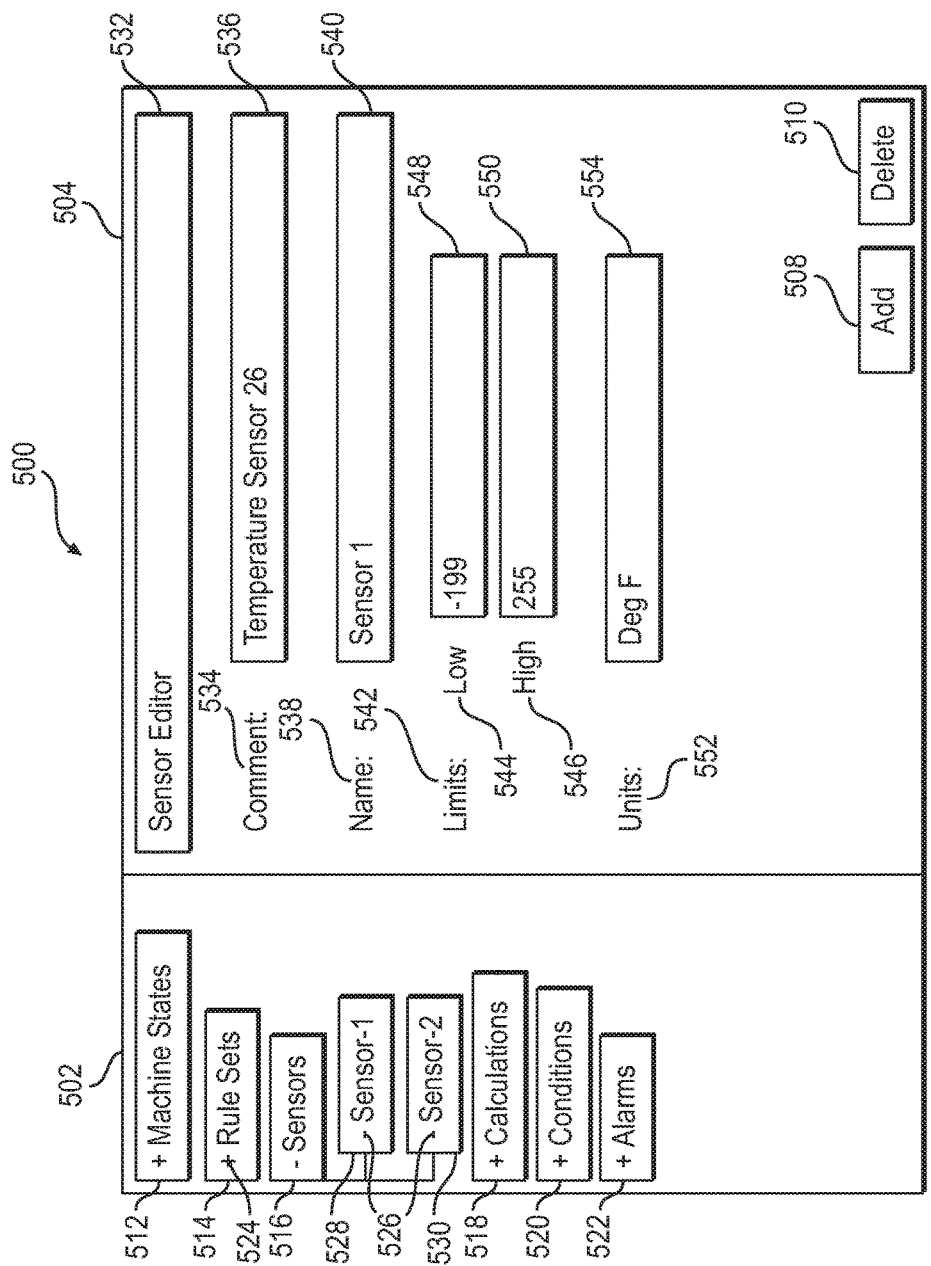
FIGS. 5-10 are pictorial illustrations of exemplary disclosed graphical user interfaces (GUI) that may be used in conjunction with the model generation and monitoring system of FIG. 2.

FIG. 5 illustrates an exemplary graphical user interface (GUI) 500 for selecting one or more of sensors 26-32 as described in, for example, step 402 of method 400. As illustrated in FIG. 5, GUI 500 may represent a graphical arrangement for adding, removing, and/or selecting one or more of sensors 26-32. GUI 500 may include windows 502, 504, and buttons 508, 510.

Window 502 may display a menu including one or more expandable menu items. Thus, for example, window 502 may include menu item 512 labeled "Machine States," menu item 514 labeled "Rule Sets," menu item 516 labeled "Sensors," menu item 518 labeled "Calculations," menu item 520 labeled "Conditions," and menu item 522 labeled "Alarms." Each of menu items 512-522 may include a symbol 524 labeled "+" or a symbol 526 labeled "−" that may allow menu items 512-522 to be expanded or collapsed. For example, activating the + symbol 524 associated with menu item 516 may display a sub-menu including "Sensor-1" and "Sensor-2" as sub-menu items 528, 530, respectively, which may appear as buttons. Sub-menu items (or buttons) 528 and 530 may be grouped under menu item 516. Activating the − symbol 526 associated with menu item 514 may cause the sub-menu to collapse and disappear with only the menu item 516 with the + symbol 524 displayed on GUI 500. As used in this disclosure, activating refers to selecting a particular GUI item, for example, by clicking it using a mouse, tapping it using a finger or stylus, using the arrow and/or other keys on a keyboard, using voice-activated commands, or using any other method of selection on a GUI known in the art.

Although window 502 has been illustrated in FIG. 5 as including discrete menu items 512-522 displayed in window 502, it is contemplated that window 502 may include other types of menu displays know in the art. For example, in some exemplary embodiments, window 502 may instead include a drop-down menu listing the menu items labeled Machine States, Rule Sets, Sensors, Calculations, Conditions, Alarms, etc. Selecting one of these items may open up a sub-menu or alternatively may display a pull-down sub-menu, which may present additional sub-menu items for selection. Additionally or alternatively, other menu display and selection arrangements known in the art may be used to display the menu illustrated in window 502 of FIG. 5.

Window 504 of GUI 500 may display details regarding a sub-menu item selected from the menu in window 502. Thus, for example, as illustrated in FIG. 5, selecting sub-menu item 526 labeled Sensor-1 in window 502 may display attributes associated with Sensor-1 in window 504. Sensor-1 may represent, for example, sensor 26 (see FIG. 2) associated with component 22. As illustrated in the exemplary embodiment of FIG. 5, window 504 may include title 532 labeled "Sensor Editor." Window 504 may also include text 534 labeled "Comment" and a text box 536 displayed adjacent to the label Comment. Operators 46, 48 may be able to enter textual information describing the selected sensor (e.g. Sensor-1) in text box 536 using input device 54. For example, as illustrated in FIG. 5, operators 46, 48 may enter the text "Temperature Sensor 26" in text box 536. Window 504 may also include text 538 labeled "Name" and a text box 540 displayed adjacent to the label Name. As illustrated in FIG. 5, text box 540 may display the name "Sensor-1." It is contemplated that operator 42 may be able to change the name Sensor-1 in text box 540 using input device 54. It is also contemplated that changing the name in text box 540 may automatically update the name displayed on sub-menu item 528 in window 502.

Window 504 may include text 542 labeled "Limits," text 544 labeled "Low," and text 546 labeled "High." Text boxes 548 and 550 may be disposed adjacent the labels Low and High, respectively. It is contemplated that operators 46, 48 may be able to enter numerical values representing the low (i.e. minimum) and high (i.e. maximum) expected values of measurements from Sensor-1 in text boxes 548 and 550, respectively. Thus, for example, as illustrated in FIG. 5, operator 42 may be able to enter and/or change the low value displayed as "−199" in text box 548 and the high value displayed as "299" in text box 550.

Window 504 may also include text 552 labeled "Units" and a text box 554 displayed adjacent to the label Units. As illustrated in FIG. 5, text box 554 may display "Deg F" indicating that a unit of measurement corresponding to the values in text boxes 548, 550 may be degrees Fahrenheit. Operators 46, 48 may be able enter other units of measurement in text box 554. In some exemplary embodiments, text box 554 may be replaced by a pull-down menu, listing all the possible units of measurement corresponding to Sensor-1 (e.g. deg C., deg F., Kelvin, etc. for temperature, m/s, ft/s, rpm, etc. for speed, liters/s, gallons/s, etc. for flow-rate, etc.) Operators 46, 48 may be able to select a unit of measurement for Sensor-1 by selecting one of the units listed in the pull-down menu.

Button 508 in window 504 may be labeled "Add." Activating button 508 may cause a new sensor to be added to the diagnostic model. For example, activating button 508 may add "Sensor-2," which may be displayed as sub-menu item 530 under sub-menu item 526. Attributes associated with Sensor-2 may be displayed in window 504 allowing operators 46, 48 to change the attributes of Sensor-2 by editing text boxes labeled 536, 540, 548, 550, and/or 554. Button 510 in window 504 may be labeled "Delete." Activating button 510 may remove or delete a currently selected sensor (e.g. Sensor-1 or Sensor-2) from the diagnostic model. It is also contemplated that operators 46, 48 may be able to add sensors by right-clicking on button 516. For example, right-clicking button 516 may display a pull-down menu listing all the sensors (e.g. sensors 26-32, etc.) associated with component 22 or machine 10. Operators 46, 48 may be able to select one or more sensors 26-32 from the pull-down menu. It is further contemplated that operators 46, 48 may be able to delete sensors by right-clicking on buttons 528, 530, etc. For example, right-clicking on buttons 528 or 530 may reveal a button labeled "Delete," selecting which may cause the particular sensor (e.g. Sensor-1 or Sensor-2) to be deleted from the diagnostic model. It is also contemplated that GUI 500 may provide operator 42 with other ways to add or remove sensors. For example, clicking button 516 may reveal a menu of available sensors 26-32, each having a checkbox. Selecting one or more of the checkboxes may add the corresponding sensors as sub-menu items under button 516. One of ordinary skill in the art would recognize that there may be many other ways of allowing operators 46, 48 to select and/or add sensors to the diagnostic model.

Although only a few attributes (e.g. name, limits, units, etc.) have been illustrated in FIG. 5, it is contemplated that GUI 500 may include additional attributes. For example, GUI 500 may include an attribute for specifying whether a sensor (e.g. Sensor-1) is analog, digital, or enumerated. As used in this disclosure an enumerated sensor may display values in terms of labels 1, 2, 3, . . . M, where each of the labels 1, 2, 3, . . . M may represent a certain range of values. Thus for example an enumerated temperature sensor may record and/or display the value "1" when the temperature ranges between 0 and 10° F., the value "2" when the temperature ranges between 10 and 20° F., etc. GUI 500 may also include checkboxes or radio buttons that may allow operators 46, 48 to select whether to display or hide a particular sensor on GUI 500. As another example, GUI 500 may include elements for specifying lower and upper alarm limits, and/or a Tag ID.

Figure 6:
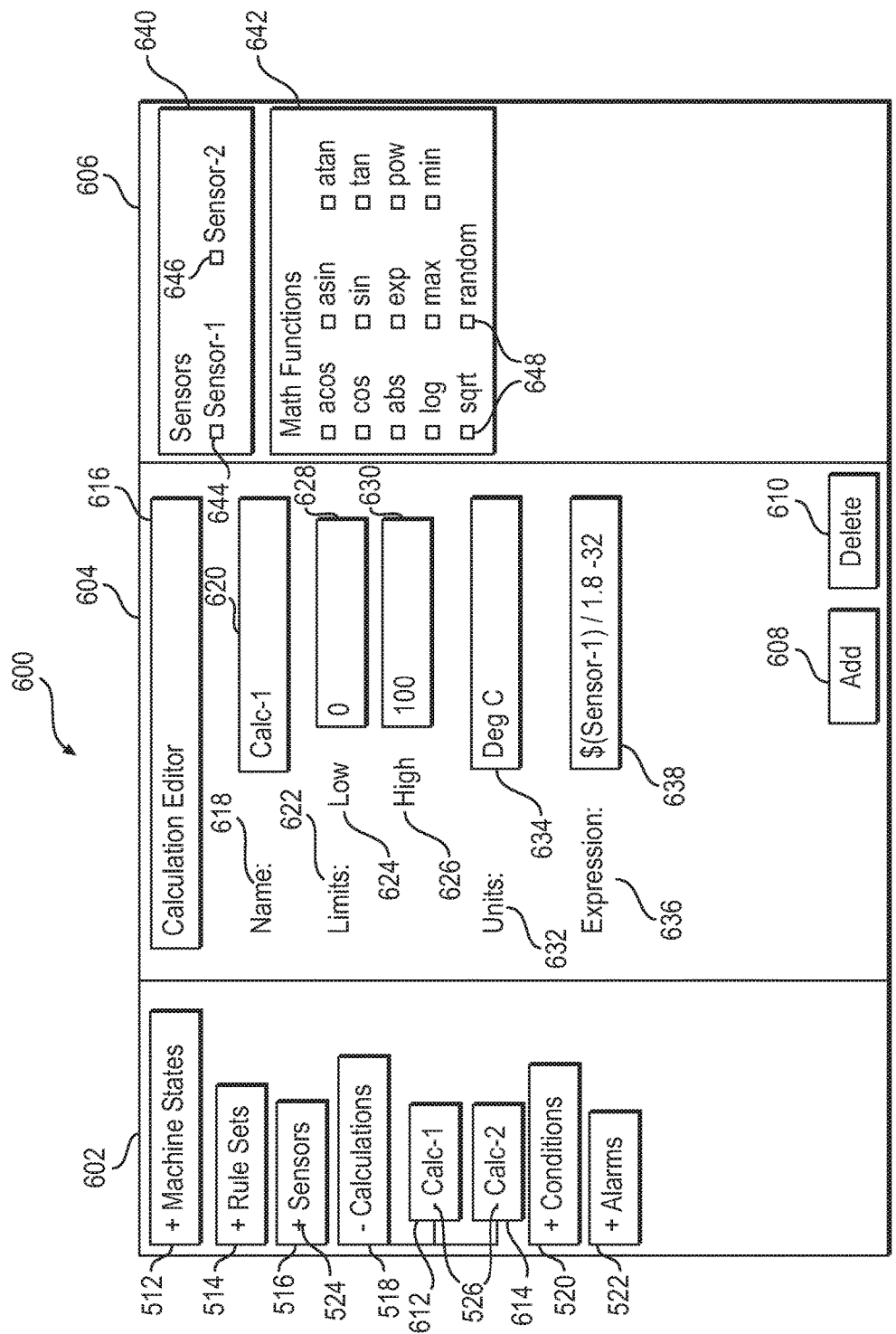

FIG. 6 illustrates an exemplary graphical user interface (GUI) 600 for specifying calculations as described in, for example, step 404 of method 400. As illustrated in FIG. 6, GUI 600 may represent a graphical arrangement for adding, removing, and/or selecting one or more calculations. GUI 600 may include windows 602, 604, 606, and buttons 608, 610.

Window 602 may display a menu including expandable menu items similar to the menu displayed in window 502 of FIG. 5. Thus, for example, window 602 may include menu items 512-522 similar to the menu items of window 502. It is contemplated that window 602 may include fewer than or more than menu items 512-522. Each of menu items 512-522 in window 602 may function in a manner similar to that described above with respect to GUI 500. Activating the + symbol 524 associated with menu item 518 may display a sub-menu, for example, including "Calc-1" and "Calc-2" as a sub-menu items 612 and 614, which may appear as buttons. Sub-menu items (or button) 612, 614 may be grouped under menu item 518. Like GUI 500, other display and selection arrangements known in the art may be used to display the menu illustrated in window 602 of FIG. 6.

Window 604 of GUI 600 may display attributes associated with a sub-menu item 612 or 614 selected from window 602. Thus, for example, as illustrated in FIG. 6, selecting sub-menu item 612 labeled "Calc-1" may display attributes associated with calculation Calc-1 in window 604. In particular, as illustrated in the exemplary embodiment of FIG. 6, window 604 may include a title 616 labeled "Calculation Editor." Window 604 may also include text 618 labeled "Name" and a text box 620 displayed adjacent to the label Name. As illustrated in FIG. 6, text box 620 may display the name Calc-1. It is contemplated that operators 46, 48 may be able to change the name Calc-1 in text box 620 using input device 54. It is also contemplated that changing the name in text box 620 may automatically update the name displayed on sub-menu item 612 in window 602.

Window 604 may include text 622 labeled "Limits," text 624 labeled "Low," and text 626 labeled "High." Text boxes 628 and 630 may be disposed adjacent the labels Low and High, respectively. It is contemplated that operators 46, 48 may be able to enter numerical values representing the low (i.e. minimum) and high (i.e. maximum) expected values of the results of calculation Calc-1 in text boxes 628 and 630, respectively. Thus, for example, as illustrated in FIG. 6, operators 46, 48 may be able to enter and/or change the low value displayed as "0" in text box 628 and the high value displayed as "100" in text box 630.

Window 604 may also include text 632 labeled "Units" and a text box 634 displayed adjacent the label Units. As illustrated in FIG. 6, text box 634 may display "Deg C" indicating that a unit of measurement corresponding to the values in text boxes 624, 626 may be degrees Celsius. Operators 46, 48 may be able enter other units of measurement in text box 634. In some exemplary embodiments, text box 634 may be replaced by a pull-down menu having a structure and function similar to that described above with respect to text box 554 of GUI 500.

Window 604 may include text 636 labeled "Expression" and a text box 638 displayed adjacent to the label Expression. As illustrated in FIG. 6, text box 636 may include a mathematical operation representing a calculation. Thus, for example, as illustrated in the exemplary embodiment of FIG. 6, text box 638 may include the expression "$ (Sensor-1)/1.8–32" that provides a mathematical operation to convert measurements collected by Sensor-1 from degrees Fahrenheit to degrees Celsius. A result obtained by performing the calculation specified in text box 638 may also be associated with the units of measurement specified in text box 634. It is contemplated that operators 46, 48 may be able to specify any other expression known in the art to determine one or more component parameters based on the data collected by one or more of sensors 26-32.

In one exemplary embodiment, operator 42 may be able to construct the expression in text box 638 by selecting and/or dragging and dropping predetermined elements and functions from window 606 into text box 638. Window 606 may include palettes 640 and 642. Palette 640 may be titled "Sensors" and may include checkboxes 644 and 646 associated with sensors labeled Sensor-1 and Sensor-2. Operators 46, 48 may be able to select one of more of Sensor-1 and Sensor-2 by activating one or more of checkboxes 644, 646. Activating checkbox 644 or 646 may insert the corresponding sensor (e.g. Sensor-1 or Sensor-2) into the expression in text box 638 of window 604. In one exemplary embodiment, operators 46, 48 may also be able to drag and drop one or more of Sensors 1 and 2 from palette 640 into text box 638. Palette 642 may be titled "Math Functions" and may include a plurality of checkboxes 648, each associated with a corresponding predetermined mathematical function including, for example, "acos" representing an inverse cosine function, "asin" representing an inverse sine function, "atan" representing an inverse tangent function, "cos" representing a cosine function, "sin" representing a sine function, "tan" representing a tangent function, "abs" representing an absolute value function, "exp" representing an exponential function, "pow" representing a variable x raised to a power y function, "log" representing a logarithm function, "max" representing a maximum value function, "min" representing a minimum value function, "sqrt" representing a square root function, and "random" representing a random number generator function. It is contemplated that palette 642 may display fewer than or more than the functions described above. It is also contemplated that window 606 may include other mathematical and/or engineering functions different from those described above. Activating any of checkboxes 648 may insert the corresponding mathematical function into the expression in text box 638 of window 604. In one exemplary embodiment, operators 46, 48 may also be able to drag and drop one or more of the mathematical function displayed in palette 642 into text box 638.

Buttons 608 and 610 in window 604 may function in a manner similar to buttons 508, 510, respectively, of GUI 500. Like buttons 508, 510, buttons 608, 610, respectively, may allow addition or deletion of a calculation to the diagnostic model. For example, activating button 608 may add calculation "Calc-2," which may be displayed as sub-menu item 614 under sub-menu item 612. Attributes associated with Calc-2 may be displayed in window 604 allowing operators 46, 48 to change the attributes of Calc-2 by editing text boxes labeled 620, 628, 630, 634, and/or 638. Activating button 610 may remove or delete a currently selected calculation (e.g. Calc-1 or Calc-2) from the diagnostic model. It is also contemplated that operators 46, 48 may be able to add calculations by right-clicking on buttons 518, 612, 614 similar to the functionality described with respect to buttons 516, 528, 530, respectively, of GUI 500.

Although only a few attributes (e.g. name, limits, units, expression, etc.) have been illustrated in FIG. 6, it is contemplated that GUI 600 may include additional attributes. For example, GUI 600 may include an attribute for specifying whether a calculation is a "Standard Calculation" or an "Event Calculation." As used in this disclosure a standard calculation may be performed at any time regardless of an operational condition (e.g. off, on, starting up, shutting down, continuous operation) of component 22. In contrast, an event calculation may be one that may be performed only during a specific event (e.g. start-up, shut-down of component 22). GUI 600 may also include checkboxes or radio buttons that may allow operators 46, 48 to select whether to display or hide a particular calculation on GUI 600.

Figure 7:
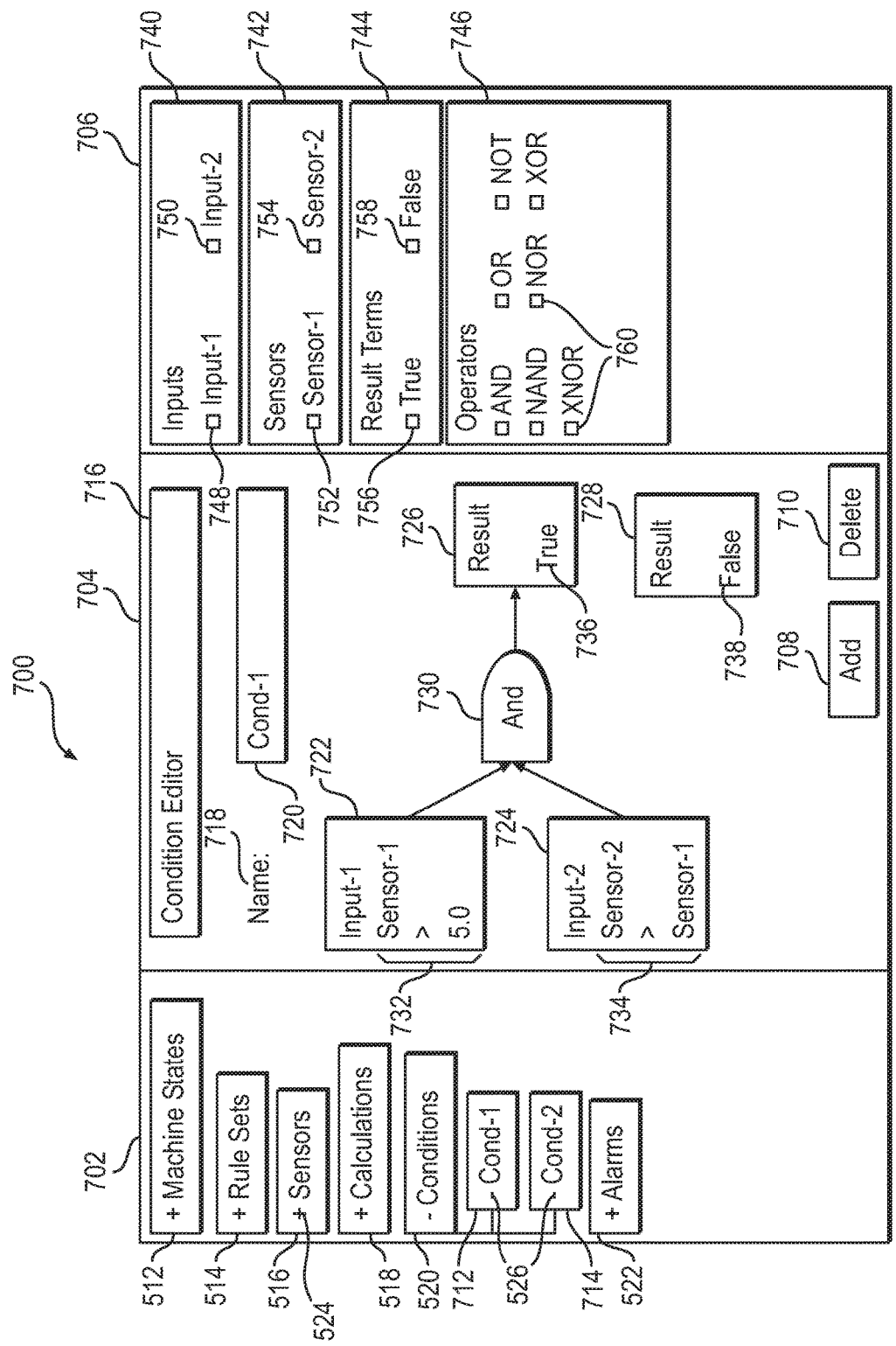

FIG. 7 illustrates an exemplary graphical user interface (GUI) 700 for specifying conditions as described in, for example, step 406 of method 400. As illustrated in FIG. 7, GUI 700 may represent a graphical arrangement for adding, removing, and/or selecting one or more conditions. GUI 700 may include windows 702, 704, 706, and buttons 708, 710.

Window 702 may display a menu including expandable menu items similar to the menu displayed in window 502 of FIG. 5. Thus, for example, window 702 may include menu items 512-522 similar to the menu items of window 502. It is contemplated that window 702 may include fewer than or more than menu items 512-522. Each of menu items 512-522 in window 702 may function in a manner similar to that described above with respect to GUI 500. Activating the + symbol 524 associated with menu item 520 may display a sub-menu, for example, including "Cond-1" and "Cond-2" as a sub-menu items 712 and 714, which may appear as buttons. Sub-menu items (or buttons) 712, 714 may be grouped under menu item 520. Like GUI 500, other display and selection arrangements known in the art may be used to display the menu illustrated in window 702 of FIG. 7.

Window 704 of GUI 700 may display attributes associated with a sub-menu item 712 or 714 selected from window 702. Thus, for example, as illustrated in FIG. 7, selecting sub-menu item 712 labeled "Cond-1" may display attributes associated with condition Cond-1 in window 704. In particular, as illustrated in the exemplary embodiment of FIG. 7, window 704 may include a title 716 labeled "Condition Editor." Window 704 may also include text 718 labeled "Name" and a text box 720 displayed adjacent to the label Name. As illustrated in FIG. 7, text box 720 may display the name Cond-1. It is contemplated that operators 46, 48 may be able to change the name Cond-1 in text box 720 using input device 54. It is also contemplated that changing the name in text box 720 may automatically update the name displayed on sub-menu item 712 in window 702.

Window 704 may include input condition boxes 722, 724, result boxes 726, 728, and boolean operator 730. Input condition box 722 may be labeled "Input-1" and may contain input condition 732. In one exemplary embodiment as illustrated in FIG. 7, input condition 732 may compare data collected by Sensor-1 to a threshold value, labeled 5 in FIG. 7. In this illustrated example, Input condition 732 may return a result "True" when data collected by Sensor-1 exceeds 5, else it may return the result "False." Input condition box 724 may be labeled "Input-2" and may contain input condition 734. In one exemplary embodiment as illustrated in FIG. 7, input condition 734 may compare data collected by Sensor-2 to data collected by Sensor-1. In this illustrated example, Input condition 734 may return a result "True" when data collected by Sensor-2 exceeds the data collected by Sensor-1, else it may return the result "False."

Boolean operator 730 may combine the conditions specified in input condition boxes 732, 734. Results of boolean operator 730 may be directed to result boxes 726 and 728. In the example illustrated in FIG. 7, boolean operator 730 may be an "AND" operator, which may return a result "True," as shown in result box 726 when both input condition boxes 722, 724 return the result True. However, when at least one of input condition boxes 722 or 724 returns the result "False," boolean operator 730 may also return the result False as shown in result box 728. Thus, condition Cond-1 may be satisfied only when the boolean operator 730 returns the result True.

In one exemplary embodiment, operators 46, 48 may be able to specify certain attributes of condition Cond-1 by selecting and/or dragging and dropping predetermined elements and functions from window 706 into window 704. Window 706 may include palettes 740, 742, 744, and 746. Palette 740 may be titled "Inputs" and may include checkboxes 748 and 750 associated with input conditions Input-1 and Input-2, respectively. Operators 46, 48 may be able to select one of more of Input-1 and Input-2 by activating one or more of checkboxes 748, 750. Activating checkbox 748 or 750 may insert the corresponding input condition boxes 722 or 724 into window 704. In one exemplary embodiment, operators 46, 48 may also be able to drag and drop one or more of Input-1 and Input-2 from palette 740 into window 704. Palette 742 may be titled "Sensors" and may include checkboxes 752 and 754 associated with sensors labeled Sensor-1 and Sensor-2. Operators 46, 48 may be able to select one of more of Sensor-1 and Sensor-2 by activating one or more of checkboxes 752, 754. Activating checkbox 752 or 754 may insert the corresponding sensor (e.g. Sensor-1 or Sensor-2) into a selected one of input condition boxes 722, 724. In one exemplary embodiment, operators 46, 48 may also be able to drag and drop one or more of Sensor-1 and Sensor-2 from palette 742 into input condition boxes 722, 724. Palette 744 may be titled "Result Terms" and may include checkboxes 756 and 758 associated with results labeled "True" and "False." Operators 46, 48 may be able to select one of more of results True or False by activating one or more of checkboxes 756, 758. Activating checkbox 756 or 758 may insert the corresponding result (e.g. True or False) into a result box 726 or 728. In one exemplary embodiment, operators 46, 48 may also be able to drag and drop one or more of the result terms True or False from palette 744 into window 704.

Palette 746 may be titled "Operators" and may include a plurality of checkboxes 760, each associated with a corresponding boolean operator, for example, "AND," "OR," "NOT," "NAND," "NOR," "XOR," and "XNOR," representing well known boolean operators. Activating any of checkboxes 760 may insert the corresponding boolean operator into window 704. In one exemplary embodiment, operators 46, 48 may also be able to drag and drop one or more of the boolean operators displayed in palette 746 into window 704. Operators 46, 48 may also be able to connect input condition boxes 722, 724 and one or more of result boxes 726, 728 to boolean operator 730.

Buttons 708 and 710 in window 704 may function in a manner similar to buttons 508, 510, respectively, of GUI 500. Like buttons 508, 510, buttons 708, 710, respectively, may allow addition or deletion of a conditions to the diagnostic model. For example, activating button 708 may add condition "Cond-2," which may be displayed as sub-menu item 714 under sub-menu item 712. Attributes associated with Cond-2 may be displayed in window 704 allowing operators 46, 48 to change the attributes of Cond-2 by editing text box 720, input condition boxes 722, 724, result boxes 726, 728, and/or boolean operator 730. Activating button 710 may remove or delete a currently selected condition (e.g. Cond-1 or Cond-2) from the diagnostic model. It is also contemplated that operators 46, 48 may be able to add or delete conditions by right-clicking on buttons 520, 712, 714 similar to the functionality described with respect to buttons 516, 528, 530, respectively, of GUI 500.

Although only a few attributes (e.g. name, condition boxes, result boxes, boolean operator, etc.) have been illustrated in FIG. 7, it is contemplated that GUI 700 may include additional attributes. For example, GUI 700 may include an attribute for providing a textual description for condition Cond-1 or Cond-2. GUI 700 may also include checkboxes or radio buttons that may allow operators 46, 48 to select whether to display or hide a particular condition on GUI 700.

Figure 8:
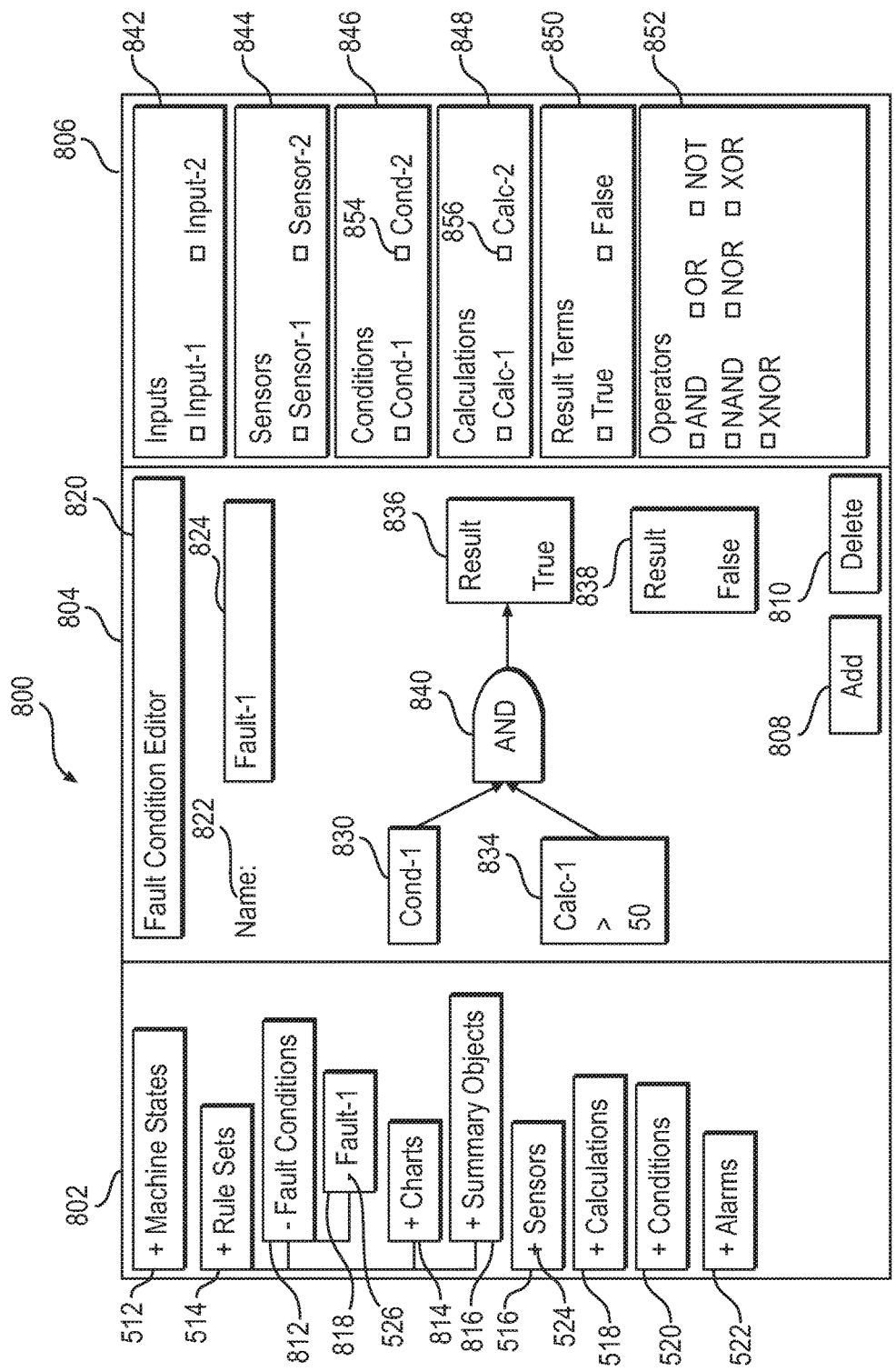

FIG. 8 illustrates an exemplary graphical user interface (GUI) 800 for specifying fault conditions as described in, for example, step 408 of method 400. As illustrated in FIG. 8, GUI 800 may represent a graphical arrangement for adding, removing, and/or selecting one or more fault conditions. GUI 800 may include windows 802, 804, 806, and buttons 808, 810.

Window 802 may display a menu including expandable menu items similar to the menu displayed in window 502 of FIG. 5. Thus, for example, window 802 may include menu items 512-522 similar to the menu items of window 502. It is contemplated that window 802 may include fewer than or more than menu items 512-522. Each of menu items 512-522 in window 802 may function in a manner similar to that described above with respect to GUI 500. Activating the + symbol associated with menu item 514 may display a sub-menu, for example, including sub-menu items labeled 812, 814, 816 labeled "Fault Conditions," "Charts," and "Summary Objects," respectively, which may appear as buttons. Further activating the + symbol associated with sub-menu item 812 may display a sub-sub-menu, for example, including sub-sub-menu item 818 labeled "Fault-1." As illustrated in FIG. 8, sub-menu items (or buttons) 812, 814, 816 may be grouped under menu item 514 labeled Rule Sets. Further sub-sub-menu item (or button) 818 may be grouped under sub-menu item 812. Like GUI 500, other display and selection arrangements known in the art may be used to display the menu illustrated in window 802 of FIG. 8.

Window 804 of GUI 800 may display attributes associated with a sub-sub-menu item 818 selected from window 802. Thus, for example, as illustrated in FIG. 8, selecting sub-sub-menu item 818 labeled "Fault-1" may display attributes associated with fault Fault-1 in window 804. Title 820, text 822, text box 824, and buttons 808, 810 may have a similar structure and function as title 716, text 718, text box 720, and buttons 708, 710, respectively, of GUI 700 shown in FIG. 7. Further, window 804 may include condition boxes 830 and 834, which may have a structure and function similar to input condition boxes 722, 724, respectively, of GUI 700 with the exception that condition boxes 830, 834 may combine one or more of conditions (e.g. Cond-1, Cond-2) specified in step 406 of method 400 and one or more of conditions based on calculations (e.g. Calc-1, Calc-2) specified in step 404 of method 400. Result boxes 836, 838 and boolean operator 840 may have a structure and function similar to result boxes 726, 728 and boolean operator 730, respectively, of GUI 700.

Window 806 may include palettes 842, 844, 846, 848, 850, and 852. Palettes 842, 844, 850, and 852 may have a structure and function similar to palettes 740, 742, 744, and 746, respectively, of GUI 700. Palettes 846 and 848 may also have a structure and function similar to any of palettes 740, 742, 744, or 746 with the exception that activating checkboxes 854 of palette 846 may add corresponding conditions (e.g. Cond-1, Cond-2) to window 804, and activating checkboxes 856 of palette 848 may add corresponding calculations (e.g. Calc-1, Calc-2) to window 804. The attributes of fault conditions (e.g. Fault-1) may also be specified by dragging and dropping one or more items from palettes 842-852 as described above with respect to palettes 740-746.

Although only a few attributes (e.g. name, condition boxes, result boxes, boolean operator, etc.) have been illustrated in FIG. 8, it is contemplated that GUI 800 may include additional attributes. For example, GUI 800 may include an attribute for providing a textual description for each fault (e.g. Fault-1). GUI 800 may also include checkboxes or radio buttons that may allow operators 46, 48 to select whether to display or hide a particular fault on GUI 800.

Figure 9:
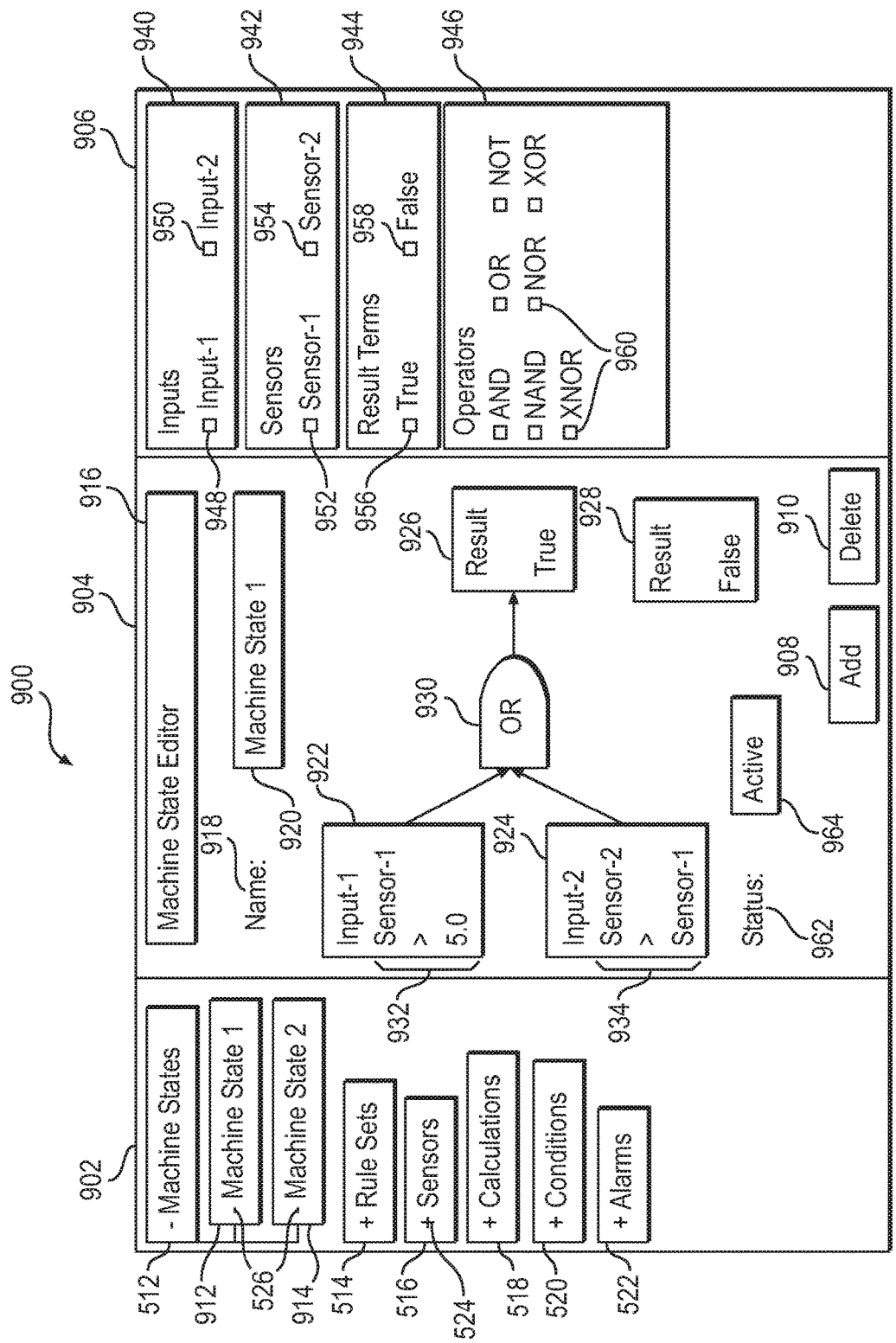

FIG. 9 illustrates an exemplary graphical user interface (GUI) 900 for specifying machine states as described in, for example, step 412 of method 400. As illustrated in FIG. 9, GUI 900 may represent a graphical arrangement for adding, removing, and/or selecting one or more machine states. GUI 900 may include windows 902, 904, 906, and buttons 908, 910.

Window 902 may display a menu including expandable menu items similar to the menu displayed in window 502 of FIG. 5. Thus, for example, window 902 may include menu items 512-522 similar to the menu items of window 502. It is contemplated that window 902 may include fewer than or more than menu items 512-522. Each of menu items 512-522 in window 802 may function in a manner similar to that described above with respect to GUI 500. Activating the + symbol associated with menu item 512 may display a sub-menu, for example, including "Machine State 1" and "Machine State 2" as sub-menu items 912 and 914. Sub-menu items 912, 914 may be grouped under menu item 512. Like GUI 500, other display and selection arrangements known in the art may be used to display the menu illustrated in window 902 of FIG. 9.

Window 904 of GUI 900 may display attributes associated with a sub-menu item 912 or 914 selected from window 902. Thus, for example, as illustrated in FIG. 9, selecting sub-menu item 912 labeled "Machine State 1" may display the corresponding attributes in window 904. Elements 916-934 of window 904 may have a structure and function similar to elements 716-734, respectively, of GUI 700 of FIG. 7. Likewise, elements 940-960 in window 906 of GUI 900 may have a structure and function similar to elements 740-760, respectively, in window 706 of GUI 700 of FIG. 7.

Window 904 may also include text 962 labeled "Status" and a text box 964 displayed adjacent to the label Status. The status of Machine State 1 may be one of "Active," "Inactive," or "Both." As illustrated in FIG. 9, text box 964 may display a status of machine state Machine State 1 as being "Active." The conditions specified by the machine state logic may be evaluated when the status of that machine state is "Active", "Inactive" or "Both". When the status is "Active," the machine state logic must be satisfied before sensor collection may commence. When the status is "Inactive," sensor data collection may commence when the Boolean logic is not satisfied. When the status is "Both," sensor data collection may commence regardless of whether the logic specified by the particular machine state (e.g. Machine State 1, Machine State 2, etc.) is satisfied.

Figure 10:
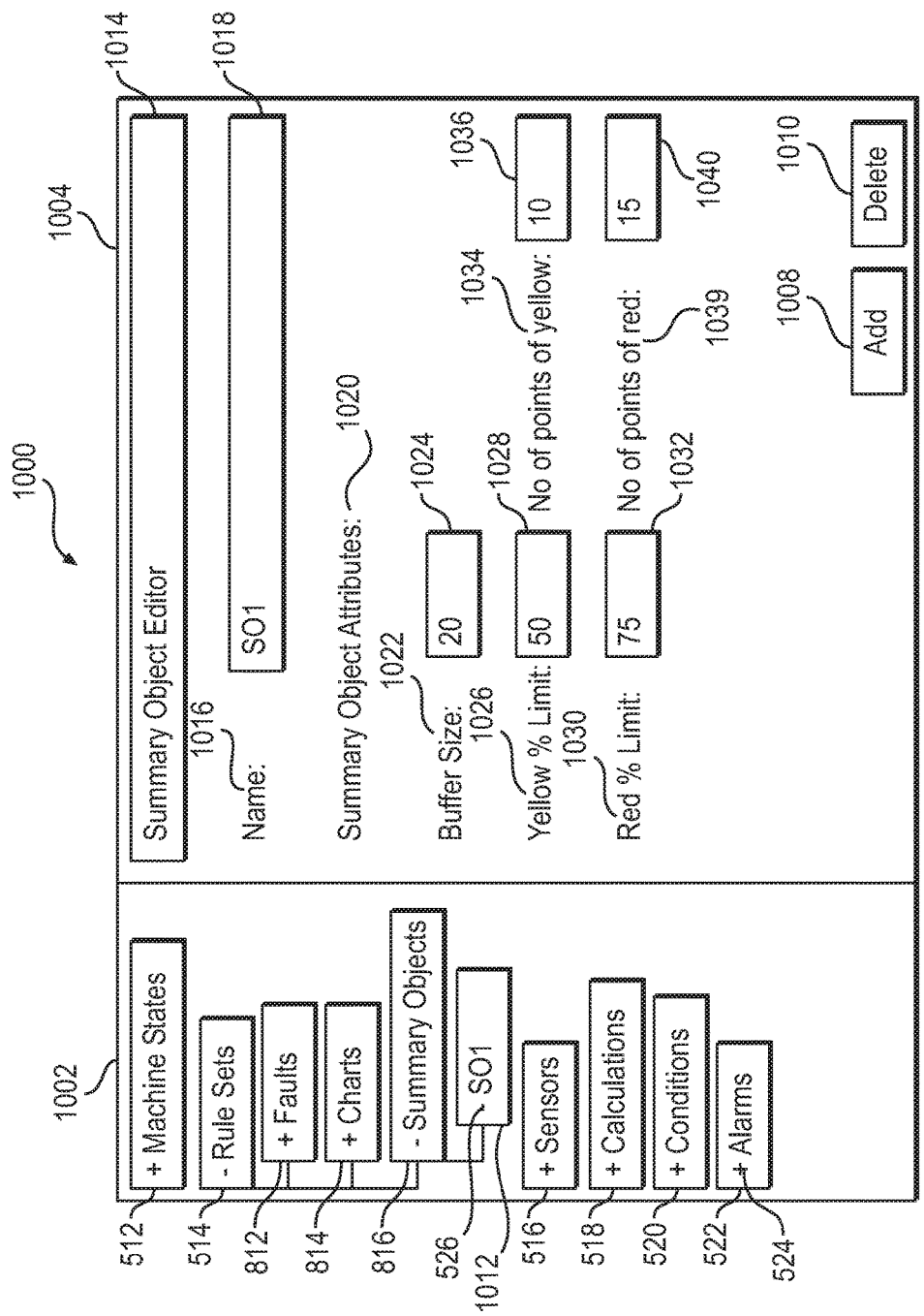

FIG. 10 illustrates an exemplary graphical user interface (GUI) 1000 for specifying one or more summary objects as described in, for example, step 414 of method 400. As illustrated in FIG. 10, GUI 1000 may represent a graphical arrangement for adding, removing, and/or selecting one or more summary objects. GUI 1000 may include windows 1002, 1004, and buttons 1008, 1010.

Window 802 may display a menu including expandable menu items similar to the menu displayed in window 502 of FIG. 5. Thus, for example, window 802 may include menu items 512-522 similar to the menu items of window 502. It is contemplated that window 802 may include fewer than or more than menu items 512-522. Each of menu items 512-522 in window 802 may function in a manner similar to that described above with respect to GUI 500. Activating the + symbol 524 associated with menu item 514 may display a sub-menu, for example, including sub-menu items labeled 812, 814, 816 labeled "Faults," "Charts," and "Summary Objects," respectively. Further activating the + symbol 524 associated with sub-menu item 816 may display a sub-sub-menu, for example, including sub-sub-menu item 1012 labeled "SO1." As illustrated in FIG. 10, sub-menu items 812, 814, 816 may be grouped under menu item 514. Further sub-sub-menu item 1012 may be grouped under sub-menu item 816. Like GUI 500, other display and selection arrangements known in the art may be used to display the menu illustrated in window 1002 of FIG. 10.

Window 1004 of GUI 1000 may display details regarding a sub-sub-menu item selected from the menu in window 1002. Thus, for example, as illustrated in FIG. 10, selecting sub-sub-menu item 1012 labeled SO1 in window 802 may display attributes associated with summary object SO1 in window 1004. As illustrated in the exemplary embodiment of FIG. 10, window 1004 may include title 1014 labeled "Summary Object Editor." Window 1004 may also include text 1016 labeled "Name" and a text box 1018 displayed adjacent to the label Name. As illustrated in FIG. 10, text box 1018 may display the name "SO1." It is contemplated that operators 46, 48 may be able to change the name SO1 in text box 1018 using input device 54. It is also contemplated that changing the name in text box 1018 may automatically update the name displayed on menu items 1012 in window 1002.

Window 1004 may include text 1020 labeled "Summary Object Attributes. Window 1004 may also include text 1022 labeled "Buffer Size:" and text box 1024 disposed adjacent to text 1022. Operators 46, 48 may be able to enter and/or change the value of buffer size displayed in text box 1024. As discussed above, buffer size may represent the number of data points used activate one or more alarms. Window 1004 may include text 1026 labeled "Yellow % Limit" and text box 1028 disposed adjacent to text 1026. Operators 46, 48 may be able to enter and/or change the value of displayed in text box 1028. As discussed above, the yellow % may represent the number of data points expressed as a percentage of all data points evaluated, which may be weighted or unweighted, for which one or more fault conditions returns a True value to display a status pill icon having yellow color. Window 1004 may include text 1030 labeled "Red % Limit" and text box 1032 disposed adjacent to text 1030. Operators 46, 48 may be able to enter and/or change the value displayed in text box 1032. As discussed above, the red % may represent the number of data points expressed as a percentage of all data points evaluated, which may be weighted or unweighted, for which one or more fault conditions returns a True value to display a status pill icon having red color.

In some exemplary embodiment, window 1004 may also include text 1034 labeled "No of points for yellow:" and text box 1036 disposed adjacent to text 1034. Operators 46, 48 may be able to enter and/or change the value displayed in text box 1036. As discussed above, value in text box 1036 may represent the total number of data points that must satisfy a fault condition to display an alert icon having yellow color. Thus, operators 46, 48 may either enter a percentage value in text box 1028 or the number of points in text box 1036. When operators 46, 48 enter a value in text box 1028, controller 52 may determine the number of points in text box 1036 based on the value entered in text box 1028 and the buffer size entered in text box 1024. Likewise, when operators 46, 48 enter a value in text box 1036, controller 52 may determine the Yellow % limit in text box 1028 based on the value entered in text box 1036 and the buffer size entered in text box 1024. In some exemplary embodiment, window 1004 may also include text 1038 labeled "No of points for red:" and text box 1040 disposed adjacent to text 1038. Operators 46, 48 may be able to enter and/or change the value displayed in text box 1040. As discussed above, value in text box 1040 may represent the total number of data points that must satisfy a fault condition to display an alert icon having yellow color. Operators 46, 48 may enter values in one of text box 1032 or 1040 and controller 52 may determine the value in the other of text box 1032 or 1040 in a manner similar to that described above with respect to text boxes 1028 and 1036, respectively.

Buttons 1008 and 1010 in window 1004 may function in a manner similar to buttons 508, 510, respectively, of GUI 500. Like buttons 508, 510, buttons 1008, 1010, respectively, may allow addition or deletion of a summary objects to the diagnostic model. For example, activating button 1008 may add new summary object "SO2," which may be displayed below sub-sub-menu item 1012. Attributes associated with summary object SO2 may be displayed in window 1004 allowing operators 46, 48 to change the attributes of summary object SO2 by editing text boxes labeled 1018, 1024, 1028, 1032, 1036, and/or 1040. Button 1010 in window 1004 may be labeled "Delete." Activating button 1010 may remove or delete a currently selected summary object (e.g. SO1) from the diagnostic model. It is also contemplated that operators 46, 48 may be able to add or delete summary objects by right-clicking on buttons 816, 1012 similar to the functionality described with respect to button 516, 528, respectively, of GUI 500.

Although only a few attributes (e.g. name, buffer size, % limits, number of points, etc.) have been illustrated in FIG. 10, it is contemplated that GUI 1000 may include additional attributes. For example, GUI 1000 may include checkboxes or radio buttons that may allow operators 46, 48 to select whether to display or hide a particular summary object on GUI 1000. Although not illustrated, similar GUIs may be displayed on display device 60 to help operators 46, 48 specify various alarms and or charts for the diagnostic model.

Figure 11:
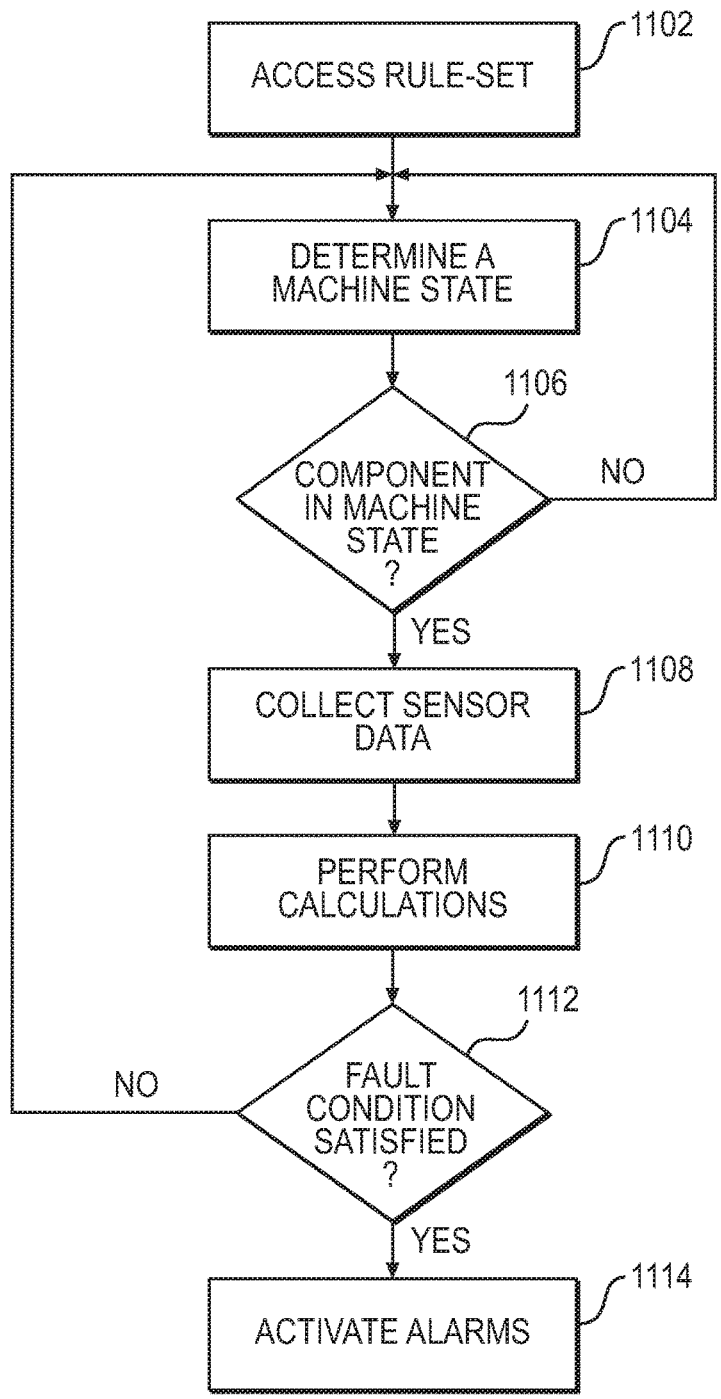
FIG. 11 is a flow chart illustrating an exemplary disclosed monitoring method for the model generation and monitoring system of FIG. 2.

FIG. 11 illustrates an exemplary method 1100 of monitoring component 22 using the diagnostic model generated using, for example, method 400. In one exemplary embodiment, controller 52 may execute instructions stored in memory 56, storage medium 58, or database 40 to perform method 1100. The order and arrangement of steps in method 1100 is provided for purposes of illustration. As will be appreciated from this disclosure, modifications may be made to method 1100 by, for example, adding, combining, removing, and/or rearranging the steps of method 1100.

Method 1100 may include a step of accessing a rule-set (Step 1102). Controller 52 may access the rule-set from database 40 associated with system 20. It is contemplated that controller 52 may access the rule-set from memory 56 or storage medium 58. Accessing the rule-set may include reading instructions and/or code associated with the rule-set. Accessing the rule-set may further include executing the instructions and/or code using controller 52.

Method 1100 may include a step of determining a machine state for data collection (Step 1104). Controller 52 may extract the instructions and/or code that specifies the machine state for component 22 and/or machine 10. Controller 52 may identify a specific sensor (e.g. a machine state sensor) selected from sensors 26-32 and specified in the machine state. Controller 52 may also receive a measurement from the machine state sensor.

Method 1100 may include a step of determining whether component 22 is in the machine state (Step 1106). To determine whether component 22 is in the machine state, controller 52 may determine whether one or more operating conditions of component 22 satisfy the operating conditions specified in the machine state. For example, controller 52 may receive one or more measurements from a machine state sensor selected from sensors 26-32 based on the instructions in the specified machine state. Controller 52 may further determine whether measurements from the machine state sensor satisfy one or more conditions specified in the machine state. Controller 52 may determine that component 22 is in the machine state when measurements from the machine state sensor satisfy the one or more conditions specified in the machine state. When controller 52 determines that component 22 is in the machine state (Step 1106: Yes), controller 52 may begin collecting data from sensors 26-32 specified in the rule-set (Step 1108). When controller determines, however, that component 22 is not the machine state (Step 1106: No), controller may return to step 1104.

Method 1100 may include a step of performing calculations specified in the rule-set. Controller 52 may execute the code or instructions stored in the rule-set to perform calculations based on the measurements received from the one or more selected sensors 26-32. Method 1100 may include a step of determining whether the one or more fault conditions specified in the rule-set are satisfied (Step 1112). To determine whether the fault conditions are satisfied, controller 52 may determine whether the one or more fault conditions return a True value based on the measurements from the one or more selected sensors 26-32, and/or the results of the calculations included in the fault conditions. When controller 52 determines that the fault conditions are not satisfied (Step 1112: No), controller 52 may return to step 1104. When controller 52 determines, however, that the fault conditions are satisfied, controller 52 may proceed to step 1114.

In step 1114, controller 52 may activate alarms specified in the rule-set. To activate the alarms, controller 52 may execute instructions related to summary objects specified in the rule-set. Controller may activate one or more alarms based on the summary objects. In particular, controller 52 may display one or more status pill icons on display device 60. Controller 52 may determine a color of the status pill icons based on the attributes of the summary object specified in the rule set. For example, controller 52 may determine a color of the one or more status pill icons by determining a number of data points (e.g. measurements from sensors 26-32 or results of calculations) satisfy the fault condition (i.e. cause the fault condition to return a True value). In step 1114, controller 52 may also display recommended maintenance actions based on the color of the status pill icons. Controller 52 may retrieve the recommended maintenance actions stored in association with fault conditions in database 40. Thus, for example, controller 52 may recommend actions that can be taken without removing machine 10 from service (e.g. changing replaceable parts like filters), or maintenance actions that may require machine 10 to be taken out of service based on the severity of the fault conditions as indicated by the status pill icons.

It will be apparent to those skilled in the art that various modifications and variations can be made to the disclosed model generation and monitoring system without departing from the scope of the disclosure. Other embodiments of the model generation and monitoring system will be apparent to those skilled in the art from consideration of the specification and practice of the model generation and monitoring system disclosed herein. It is intended that the specification and examples be considered as exemplary only, with a true scope of the disclosure being indicated by the following claims and their equivalents.

What is claimed is:

1. A monitoring system for a machine, comprising:
a database;
a memory configured to store first instructions; and
a controller configured to execute the first instructions to:
receive a first input including selection of a sensor associated with a component of the machine;
receive a second input specifying a machine state, defining a first operating condition associated with the component;
receive a third input specifying generation of a component parameter based on a measurement from the sensor;
receive a fourth input specifying a fault condition associated with at least one of the measurement and the component parameter;
generate a rule-set, including second instructions based on the first input, the second input, the third input, and the fourth input; and
store the rule-set in the database.

2. The monitoring system of claim 1, wherein the controller is further configured to execute the second instructions to:
determine whether a second operating condition of the component satisfies the machine state in the rule-set; and
when the second operating condition satisfies the machine state:
receive the measurement from the sensor;
generate the component parameter based on the measurement;
determine whether the component parameter satisfies the fault condition; and
activate an alarm when the component parameter satisfies the fault condition.

3. The monitoring system of claim 2, wherein
the controller configured to execute the first instructions is a first controller associated with a server; and
the controller configured to execute the second instructions is a second controller associated with a client.

4. The monitoring system of claim 2, wherein the sensor is a first sensor, the measurement is a first measurement, and the machine state includes:
selection of a second sensor associated with the component, the second sensor configured to generate a second measurement;
a threshold value; and
a condition based on the second measurement and the threshold value.

5. The monitoring system of claim 4, wherein determining whether the second operating condition of the component satisfies the machine state further includes:
receiving the second measurement from the second sensor;

determining whether the second measurement satisfies the condition; and determining that the second operating condition satisfies the machine state when the second measurement satisfies the condition.

6. The monitoring system of claim 1, wherein the machine state specifies a duration of time elapsed from start-up of the component.

7. The monitoring system of claim 1, wherein the third input includes at least one mathematical operation performed on the measurement to generate the component parameter.

8. The monitoring system of claim 1, wherein the controller is further configured to receive a fifth input specifying generation of a chart based on the measurement.

9. The monitoring system of claim 8, wherein specifying generation of the chart includes:

assigning the measurement to an ordinate axis of the chart; and assigning elapsed time to an abscissa axis of the chart.

10. The monitoring system of claim 8, wherein the sensor is a first sensor, the measurement is a first measurement, the first input includes selection of a second sensor associated with the component, and specifying generation of the chart includes:

assigning the first measurement to an abscissa axis of the chart; and assigning a second measurement from the second sensor to an ordinate axis of the chart.

11. The monitoring system of claim 1, wherein the controller is further configured to receive a fifth input specifying an alarm including:

a status pill icon configured to display a plurality of colors based on the fault condition; and a status strip icon configured to display a variation of colors of the status pill icon over time.

12. The monitoring system of claim 11, wherein the fifth input includes specifying a summary object, including:

a first number of data points;

a second number of data points, each of the first number of data points and the second number of data points corresponding to the measurement received from the sensor;

a first color for the status pill icon when the fault condition returns a true value for each of the first number of data points; and a second color for the status pill icon when the fault condition returns the true value for each of the second number of data points.

13. The monitoring system of claim 1, wherein the controller is configured to display a plurality of graphical user interfaces for receiving the first input, the second input, the third input, and the fourth input.

14. A method of monitoring a machine, comprising:

receiving a first input including selection of a sensor associated with a component of the machine;

receiving a second input specifying a machine state, defining a first operating condition associated with the component;

receiving a third input specifying generation of a component parameter based on a measurement from the sensor;

receiving a fourth input specifying a fault condition associated with at least one of the measurement and the component parameter;

generating a rule-set, using a first controller, the rule-set including second instructions based on the first input, the second input, the third input, and the fourth input;

storing the rule-set in a database;

accessing, using a second controller, the rule-set including the second instructions from the database; and executing, using the second controller, the second instructions to:

determine whether a second operating condition of the component satisfies the machine state in the rule-set; and when the second operating condition satisfies the machine state:

receive the measurement from the sensor;

generate the component parameter based on the measurement;

determine whether the component parameter satisfies the fault condition; and activate an alarm when the component parameter satisfies the fault condition.

15. The method of claim 14, wherein the sensor is a first sensor, the measurement is a first measurement, and specifying the machine state includes:

selecting, using the first controller, a second sensor associated with the component, the second sensor being configured to generate a second measurement;

specifying a threshold value, and specifying a condition based on the second measurement and the threshold value.

16. The method of claim 15, wherein determining whether the second operating condition of the component satisfies the machine state further includes:

receiving, using the second controller, the second measurement from the second sensor;

determining, using the second controller, whether the second measurement satisfies the condition; and determining that the second operating condition satisfies the machine state when the second measurement satisfies the condition.

17. The method of claim 14, wherein specifying the machine state includes providing a duration of time elapsed from start-up of the component.

18. The method of claim 14, wherein the third input includes at least one mathematical operation performed on the measurement to generate the component parameter.

19. The method of claim 14, further including receiving, using the first controller, a fifth input specifying generation of a chart based on the measurement.

20. The method of claim 14, further including receiving a fifth input that includes:

specifying a first number of data points;

specifying a second number of data points, each of the first number of data points and the second number of data points corresponding to the measurement received from the sensor;

specifying a first color for a status pill icon when the fault condition returns a true value for each of the first number of data points; and specifying a second color for the status pill icon when the fault condition returns the true value for each of the second number of data points.

* * * * *